(12) United States Patent
Sergin

(10) Patent No.: US 9,441,573 B1
(45) Date of Patent: Sep. 13, 2016

(54) TWO-STROKE RECIPROCATING PISTON INJECTION-IGNITION OR COMPRESSION-IGNITION ENGINE

(71) Applicant: Combustion Engine Technolgies, LLC, Lompoc, CA (US)

(72) Inventor: Alexander Sergin, Lompoc, CA (US)

(73) Assignee: Combustion Engine Technologies, LLC, Lompoc, CA (US)

( * ) Notice: Subject to any disclaimer, the term of this patent is extended or adjusted under 35 U.S.C. 154(b) by 0 days.

(21) Appl. No.: 14/964,471

(22) Filed: Dec. 9, 2015

(51) Int. Cl.
| | |
|---|---|
| F02F 1/22 | (2006.01) |
| F02M 31/14 | (2006.01) |
| F02B 25/02 | (2006.01) |
| F02D 23/00 | (2006.01) |
| F02B 1/14 | (2006.01) |
| F02B 75/02 | (2006.01) |

(52) U.S. Cl.
CPC . *F02F 1/22* (2013.01); *F02B 1/14* (2013.01); *F02B 25/02* (2013.01); *F02B 75/02* (2013.01); *F02D 23/00* (2013.01); *F02M 31/145* (2013.01); *F02B 2075/025* (2013.01)

(58) Field of Classification Search
CPC ........ F02F 1/22; F02F 3/26; F02F 3/28; F02B 23/06; F02B 23/0645; F02B 23/0696; F02B 25/02; F02B 25/04; F02B 75/02; F02B 2075/025; F02D 23/00; F02M 53/00; F02M 61/00
USPC ............. 123/65 R, 65 A, 65 P, 65 PE, 197.2, 123/193.6, 193.2
See application file for complete search history.

(56) References Cited

U.S. PATENT DOCUMENTS

| | | |
|---|---|---|
| 2,033,810 A | 10/1934 | Bernard |
| 2,662,510 A | 12/1950 | French |
| 4,359,017 A | 11/1982 | May |
| 4,399,778 A | 8/1983 | Ancheta |
| 4,644,925 A | 2/1987 | Hoppie et al. |
| 4,738,227 A | 4/1988 | Kamo et al. |
| 4,875,444 A | 10/1989 | Tsuchida et al. |
| 5,054,443 A | 10/1991 | Kawamura |
| 5,078,107 A | 1/1992 | Morikawa |
| 5,454,356 A | 10/1995 | Kawamura |
| 5,799,629 A | 9/1998 | Lowi, Jr. |
| 5,832,880 A | 11/1998 | Dickey |
| 5,870,992 A | 2/1999 | Kamura et al. |
| 5,887,566 A | 3/1999 | Glauber et al. |
| 6,062,189 A | 5/2000 | Kaneko et al. |

(Continued)

FOREIGN PATENT DOCUMENTS

DE 102009015905 A1 10/2010

*Primary Examiner* — Grant Moubry
(74) *Attorney, Agent, or Firm* — Felix L. Fischer

(57) ABSTRACT

A two-stroke reciprocating piston engine is configured with a cylinder having a cylinder head. A piston is mounted in a bore of the cylinder for reciprocating motion. A symmetrically shaped combustion chamber is defined by a crown of the piston at top dead center and the cylinder head. At least two valved inlet ports having orifices positioned in the cylinder head symmetrically with respect to the axis are connected to receive pressurized oxidizer charge. At least two unvalved exhaust ports having apertures positioned in the cylinder wall symmetrically with respect to the axis are provided. The exhaust ports are exposed with the piston proximate bottom dead center and are operatively positioned with respect to the at least two valved inlet port orifices for forced gas exchange in the cylinder. At least one fuel injection device introduces fuel symmetrically into the combustion chamber.

27 Claims, 21 Drawing Sheets

(56) References Cited

U.S. PATENT DOCUMENTS

| | | |
|---|---|---|
| 6,089,195 A | 7/2000 | Lowi, Jr. |
| 6,182,632 B1 | 2/2001 | Yanagihara |
| 6,925,971 B1 * | 8/2005 | Peng ............... F02B 71/04 123/46 R |
| 7,032,548 B2 * | 4/2006 | Tusinean ............. F02B 71/045 123/46 R |
| 8,095,294 B1 | 1/2012 | Griffiths et al. |
| 8,448,440 B2 * | 5/2013 | Peoples ................. 123/50 R |
| 2004/0187813 A1 * | 9/2004 | Meyer ................. F01M 3/02 123/73 AD |
| 2006/0016403 A1 | 1/2006 | Gurin et al. |
| 2006/0123788 A1 | 6/2006 | Gobert et al. |
| 2007/0157914 A1 * | 7/2007 | Fattorusso ............. F02B 33/04 123/73 PP |
| 2007/0227493 A1 | 10/2007 | Cheiky |
| 2009/0183710 A1 | 7/2009 | Philberth |
| 2010/0024759 A1 * | 2/2010 | Dobransky ............. F16J 1/08 123/193.6 |
| 2012/0118262 A1 | 5/2012 | Johnson |
| 2013/0000596 A1 | 1/2013 | Diaz Escano |
| 2013/0340710 A1 | 12/2013 | Fukuyama et al. |
| 2014/0048046 A1 | 2/2014 | Saeki |
| 2014/0209057 A1 | 7/2014 | Pouring et al. |

\* cited by examiner

TWO-STROKE RECIPROCATING PISTON INJECTION-IGNITION OR COMPRESSION-IGNITION ENGINE

REFERENCE TO RELATED APPLICATIONS

This application is copending with application Ser. No. 14/842,131 filed on Sep. 1, 2015 entitled ADIABATIC FUEL INJECTION-IGNITION METHOD AND DEVICE by inventor Alexander Sergin and having a common assignee with the present application, the disclosure of which is incorporated herein by reference.

BACKGROUND

1. Field of the Invention

The embodiments disclosed herein relate generally to internal combustion engines and more particularly to a high efficiency, high power density and reduced emissions two-stroke engine employing a forced induction system and cylinder scavenging system having multiple valved inlets placed in the cylinder head symmetrically with respect to an axis of the cylinder bore and with unvalved outlets placed in the cylinder wall symmetrically with respect to the axis, the outlets exposed with the piston proximate bottom dead center, and a symmetrically shaped combustion chamber centrally located in the cylinder bore into which at least one fuel injection device introduces fuel symmetrically with respect to the axis.

2. References to Related Art

Internal combustion engines known in the prior art have difficulty providing greater power density, greater efficiency and lower emission levels at once since improvement of one creates penalties in another. More particularly four-stroke engines cyclically operate with one power cycle at every two revolutions of the output shaft, allocating one revolution for the cylinder scavenging process. Two-stroke engines with crankcase ventilation systems cyclically operate with a power cycle at every revolution of the output shaft potentially producing about twice the power compared to four-stroke engines, but producing unacceptable high emission levels due to lack of having a dedicated lubrication system and difficulty controlling the cylinder scavenging process. Two-stroke compression-ignition engines have highly restricted cylinder scavenging systems which results in decreased mechanical efficiency of the engine.

Four-stroke engines with inlet and exhaust valves in the cylinder head may employ four or five valves per cylinder to provide greater volumetric efficiency compared to a more simple two valve system for example. However, the cylinder head has fixed space, which limits the available area for valves. Exhaust as well as inlet valves are required which results in reduced port sizes and associated limitations to volumetric efficiency.

Other disadvantages of four-stroke engines, and particularly Otto cycle engines, are the limitation on the number fuels which can used, as well as limitation of the compression ratios and high heat losses of combustion from high surface-to-volume ratio of the combustion chamber due to the presence of valve reliefs, which result in decreased combustion thermal efficiency. An additional Otto cycle engine disadvantage is high intake pumping losses due to throttling which results in decreased mechanical efficiency.

Other disadvantages of four-stroke engines, and particularly compression-ignition engines, also known as Diesel cycle engines, are high pumping losses in the compression cycle and even more restricted diameters of the valves and ports than Otto cycle engines. Intake of a full charge and high compression in all operating conditions is necessary for Diesel engines to keep the temperature of compressed oxidizer above the self-combustion fuel temperature for ignition.

It is therefore desirable to provide an engine with an efficient less restricted high volume cylinder scavenging system to maximize volumetric efficiency, combustion thermal efficiency and mechanical efficiency with reduced emissions. Additionally, it is desirable to provide an injection-ignition engine with fuel injection directly into the combustion chamber creating ignition from heated fuel injected into the compressed oxidizer, resulting in negligible ignition delay with a greater combustion thermal efficiency. Furthermore, it is desirable to provide an engine accepting high compression ratios with the ability to operate at a variable compression, having reduced pumping losses in both intake and compression cycles and operating with any desired type of fuel. It is also desirable to provide an engine with a two-stroke operation cycle for a greater power density for a particular engine displacement thereby allowing displacement to be reduced for the same engine output requirements. The reduction in displacement results in reduced fuel consumption decreased total emissions, and reduced engine dimensions and weight thereby lowering manufacturing cost.

SUMMARY OF THE INVENTION

The embodiments disclosed herein provide a two-stroke reciprocating piston engine configured with a cylinder having a cylinder bore and a cylinder wall with a cylinder head mounted to the cylinder. A piston is mounted in the cylinder bore for reciprocating motion between a top dead center position and a bottom dead center position. A combustion chamber, defined by a crown of the piston at top dead center and the cylinder head, is symmetrically shaped and centrally located in the cylinder bore symmetrical with respect to an axis of the cylinder bore. At least two valved inlet ports having orifices positioned in the cylinder head symmetrically with respect to the axis are connected to receive pressurized oxidizer charge. At least two unvalved exhaust ports having apertures positioned in the cylinder wall symmetrically with respect to the axis are provided. The exhaust ports are exposed with the piston proximate the bottom dead center position and are operatively positioned with respect to the at least two valved inlet port orifices for forced gas exchange in the cylinder. At least one fuel injection device introduces fuel into the combustion chamber symmetrically with respect to the axis.

DETAILED DESCRIPTION

The embodiments disclosed herein specifically increase power density, increase efficiency and improve emission over all prior art internal combustion engines in a single solution without the requirement for trading penalties in one area to enhance another. For purposes of the disclosure herein total efficiency of the engine is a combination of volumetric efficiency, combustion thermal efficiency and mechanical efficiency. The embodiments provide a reciprocating piston engine with a two-stroke cycle with improved cylinder scavenging allowing enhanced volumetric efficiency. Forced induction with multiple valved inlets placed in the cylinder head, four in an exemplary embodiment, using cylinder head area available due to lack of any exhaust ports in the cylinder head, allows for a greater number of inlet ports. This results in increasing inlet oxidizer volume to the cylinder in each intake cycle. Unvalved exhaust ports placed in the cylinder wall having apertures exposed during piston reciprocation enhance exhaust flow by the ability to increase the total area of the apertures of the exhaust ports decreasing restriction of the exhaust flow. Variable compression may be accomplished by pressure control of a compressor providing the forced induction of the oxidizer into the cylinder. In addition a fuel conditioner and injector device, which uses combustion heat energy for adiabatically heating and pressurizing a liquid fuel to above a critical point from a lower temperature and pressure of a liquid fuel delivery system prior to fuel entry into a combustion chamber of the engine, allows injection with ignition independent of the temperature of the oxidizer further enhancing the efficiency of the engine. For purposes of definition, the term oxidizer as used herein may comprise air or air treated with any oxygen containing supplement.

Placement of inlet port orifices in the cylinder head symmetrically with respect to an axis of the cylinder bore in combination with corresponding symmetrical placement of exhaust port apertures enhances gas exchange to create scavenging of the cylinder resulting in increased volumetric efficiency of the engine.

Figure 1A:
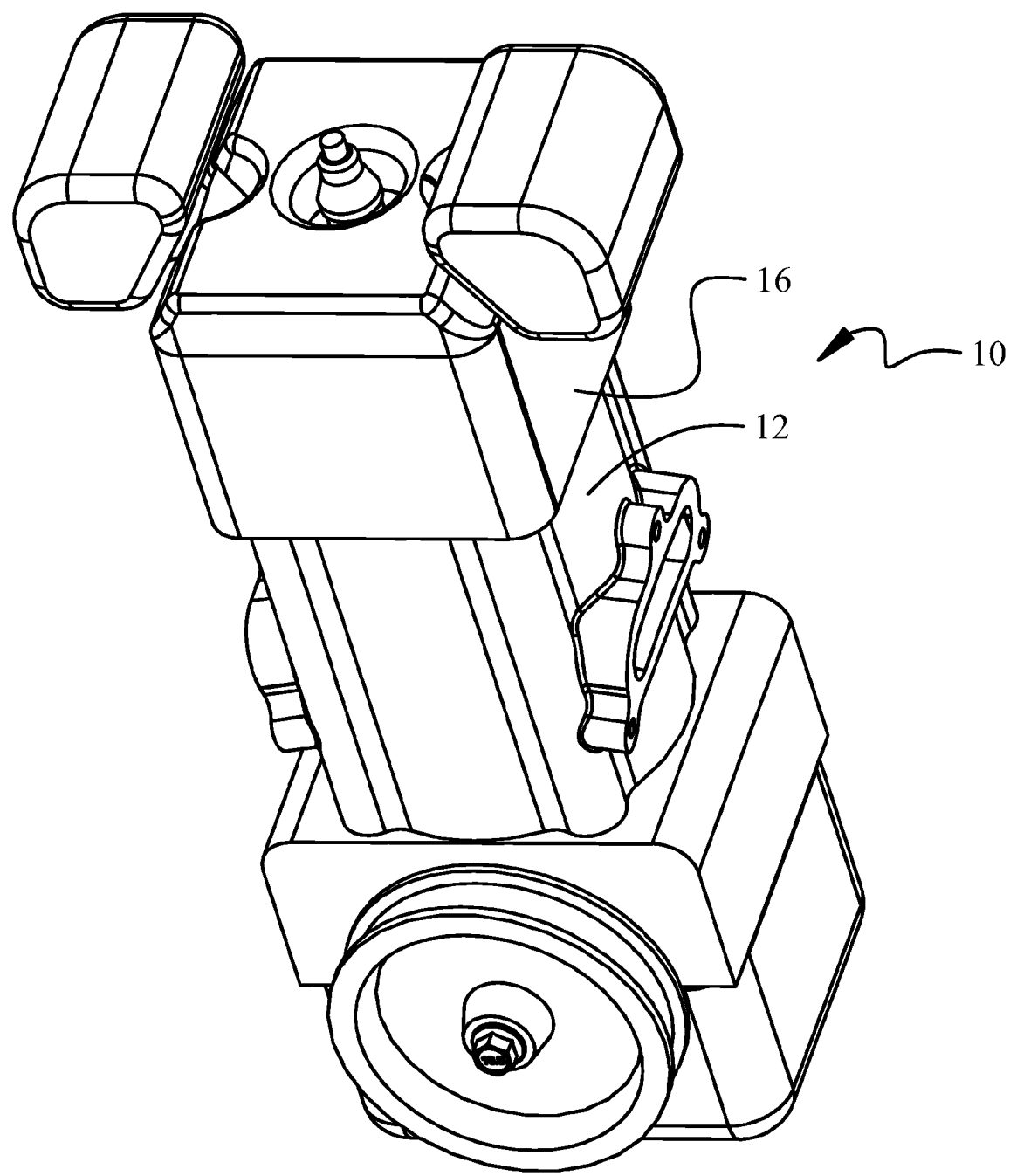
FIG. 1A is a perspective view of an exemplary single cylinder engine as a representative embodiment.
Figure 1B:
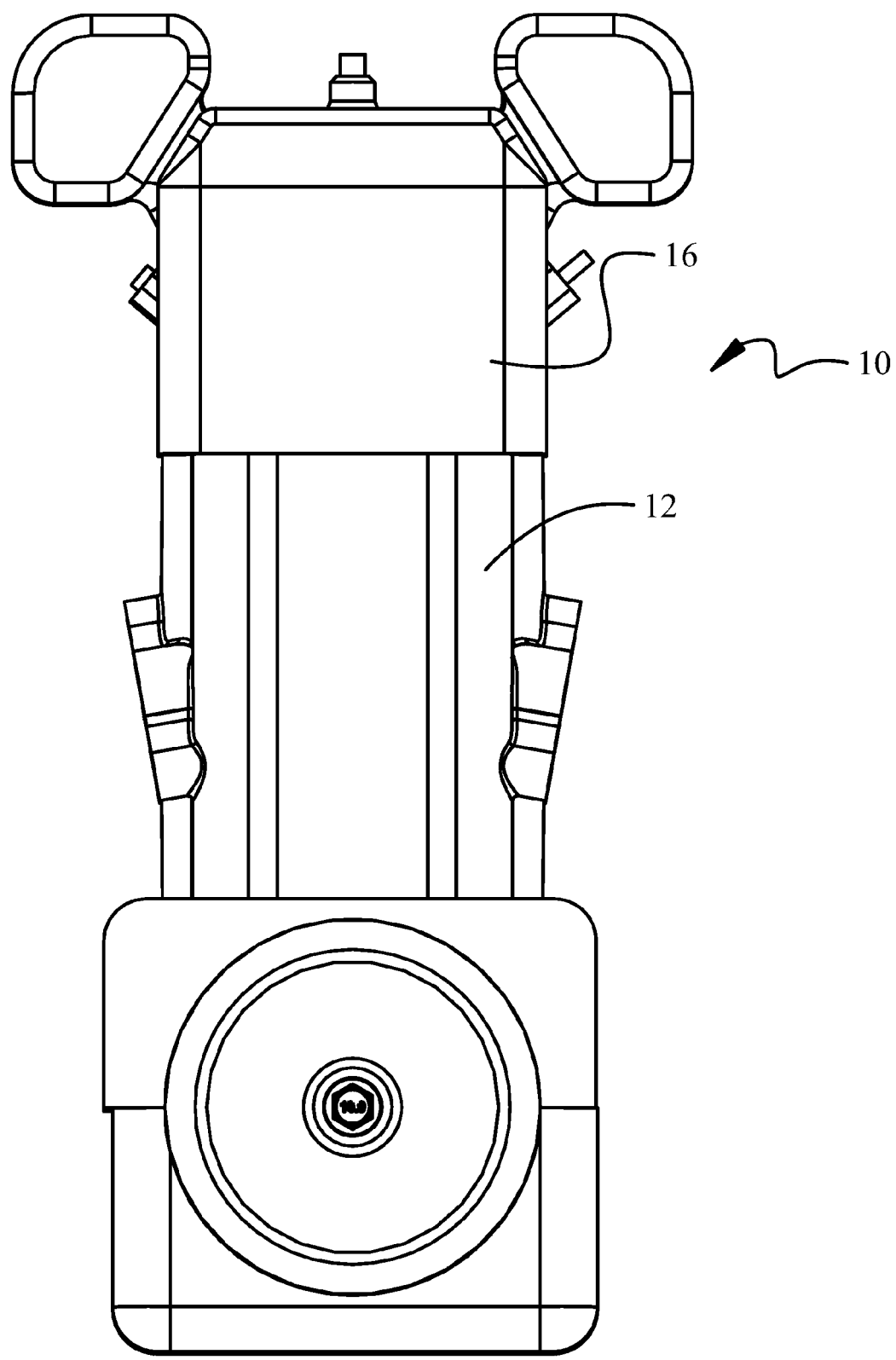
FIG. 1B is front view of the embodiment of FIG. 1A.
Figure 1C:
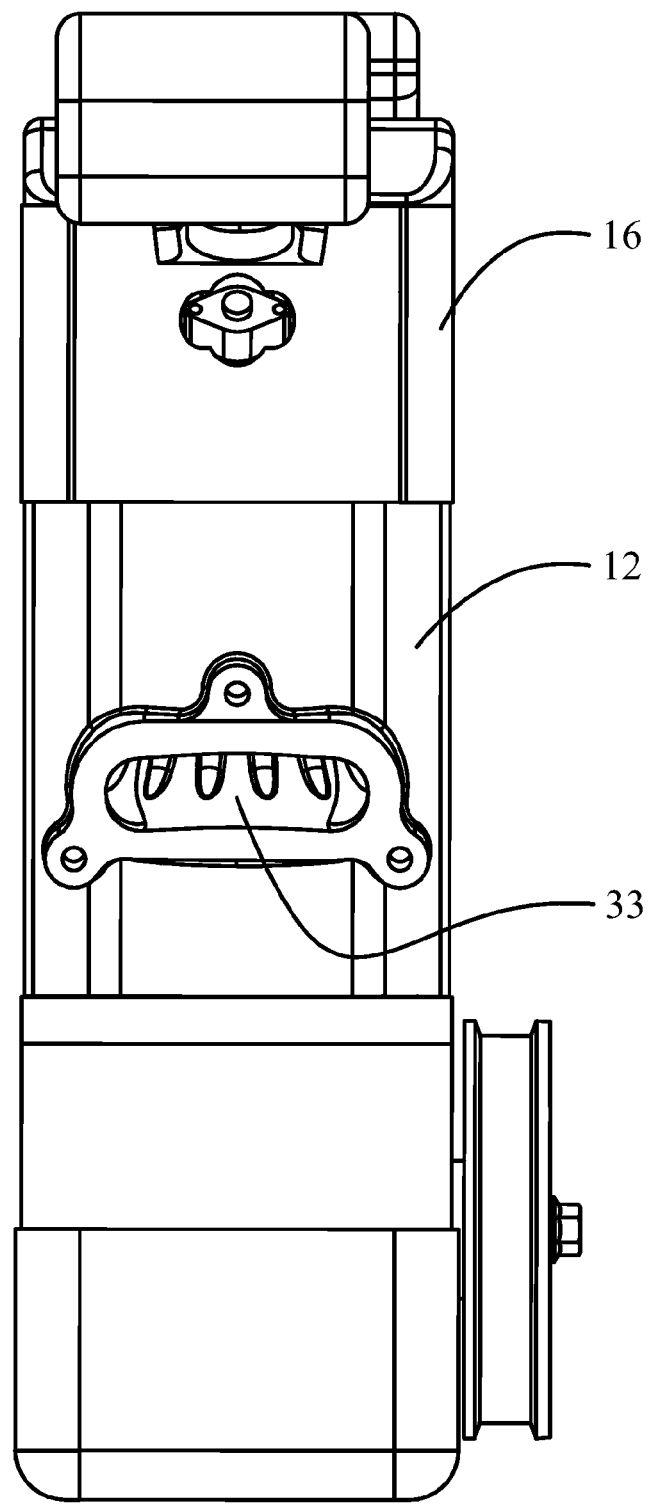
FIG. 1C is a side view of the embodiment of FIG. 1A showing the exhaust ports and apertures.
Figure 1D:
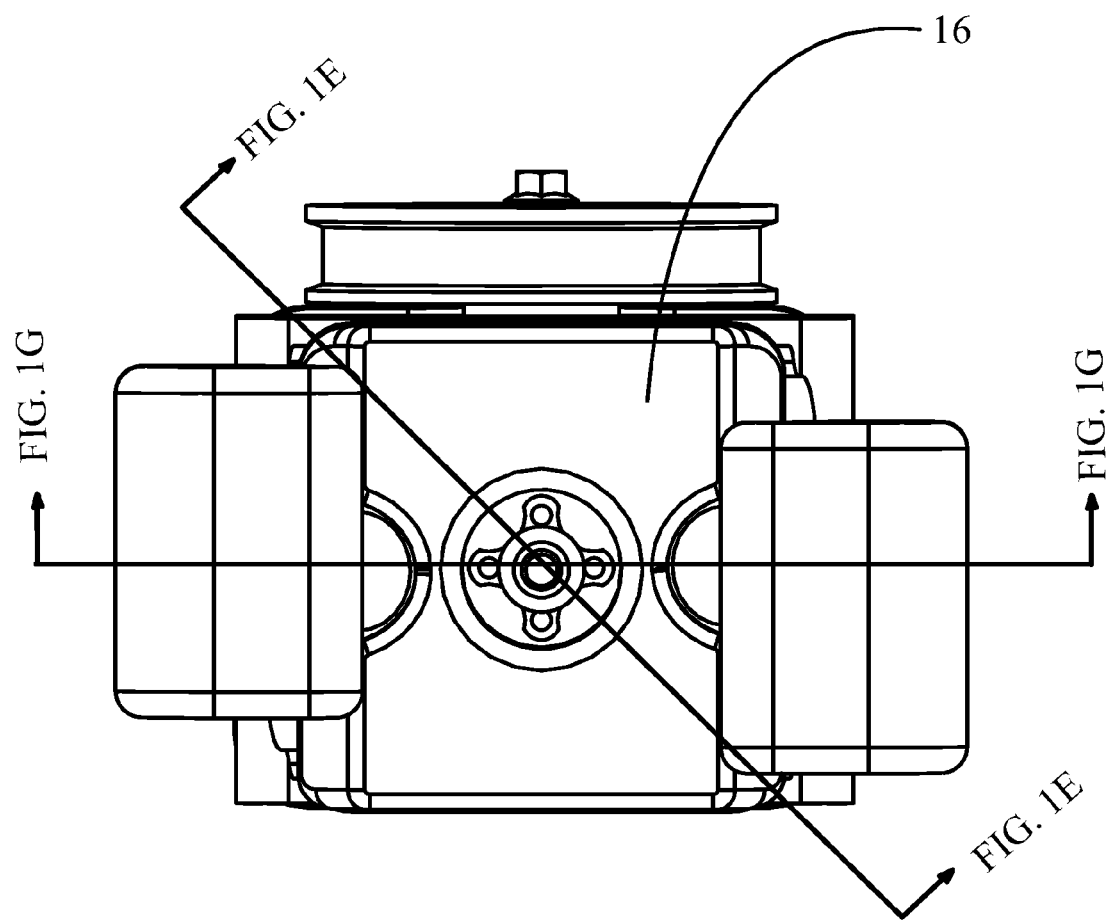
FIG. 1D a top view of the embodiment of FIG. 1A.

Referring to the drawings, an example embodiment of a single cylinder engine is shown in FIGS. 1A-1I. While a single cylinder is shown for purposes of the disclosure herein a multiple cylinder engine employing the design characteristics disclosed herein is an alternative embodiment. FIGS. 1A and 1C show the engine 10 having a cylinder 12 with a bore 14 and a wall 15, best seen in FIGS. 1E and 1F. A cylinder head 16 closes the cylinder 12. A piston 18 is mounted for reciprocating motion in the cylinder bore employing a piston connecting rod 20 and crankshaft 22 in a conventional manner.

Figure 1E:
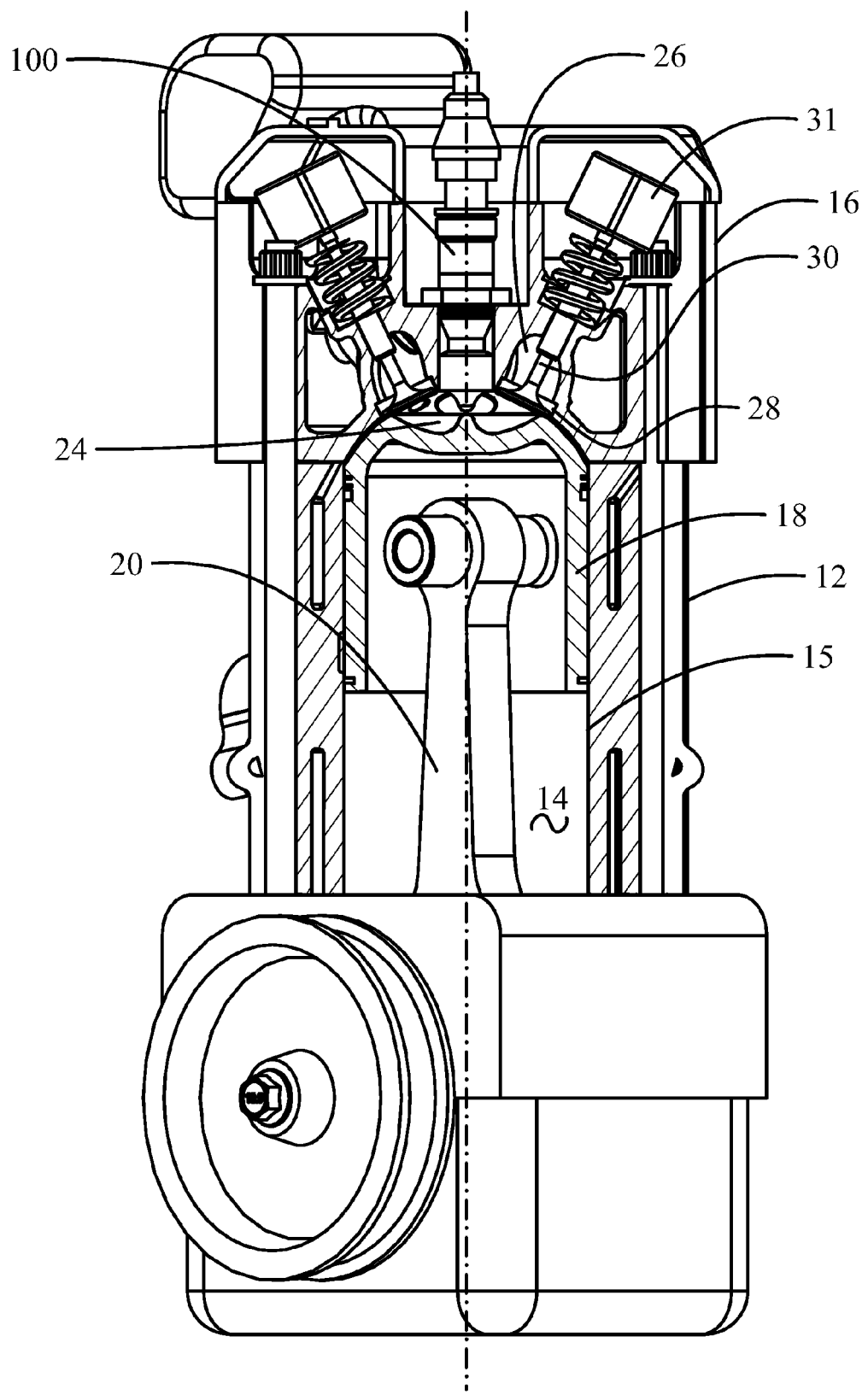
FIG. 1E is a partially sectioned view of the embodiment along lines 1E-1E of FIG. 1D.
Figure 1F:
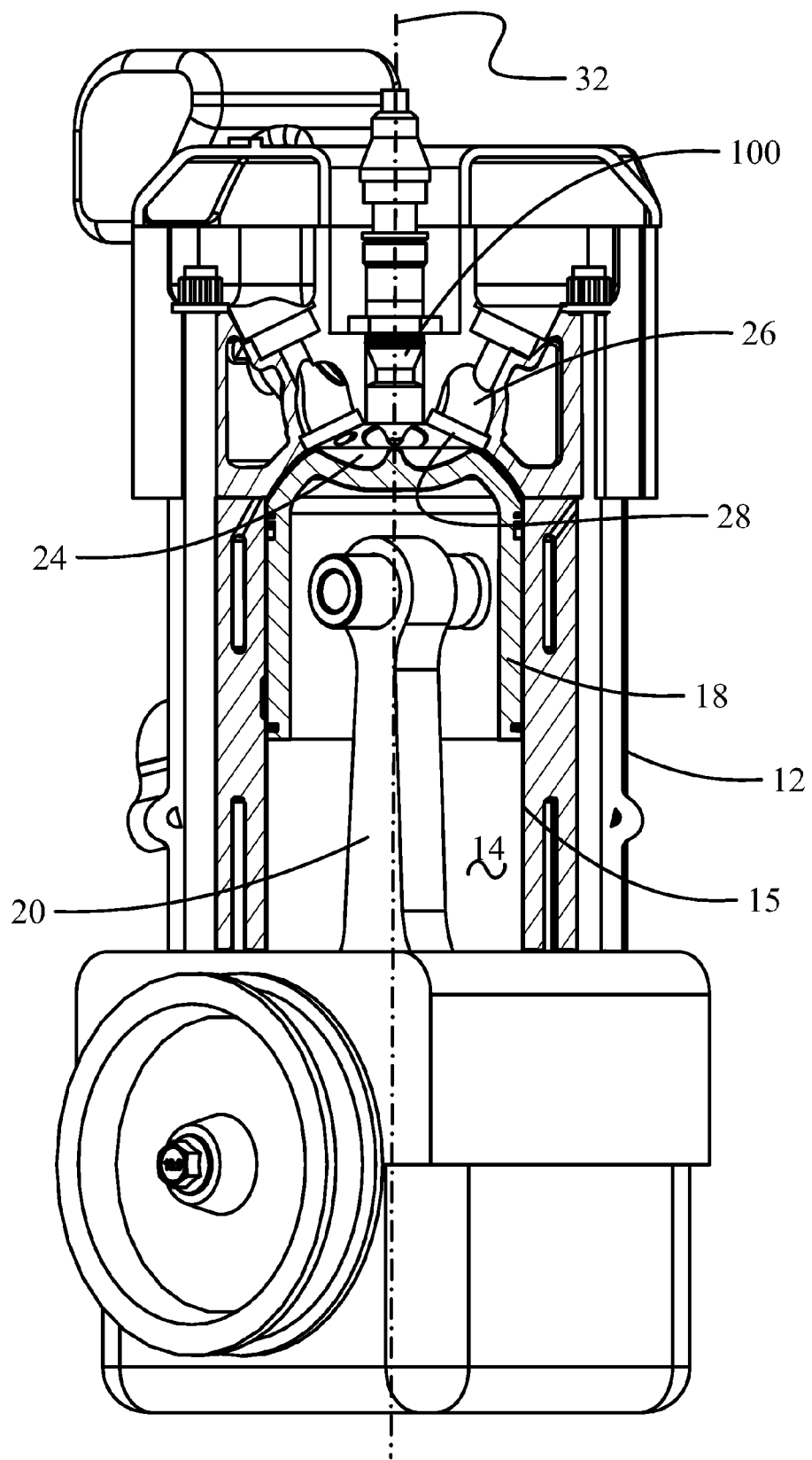
FIG. 1F is the view of FIG. 1E with the valve components removed for clarity in showing the combustion chamber.
Figure 1G:
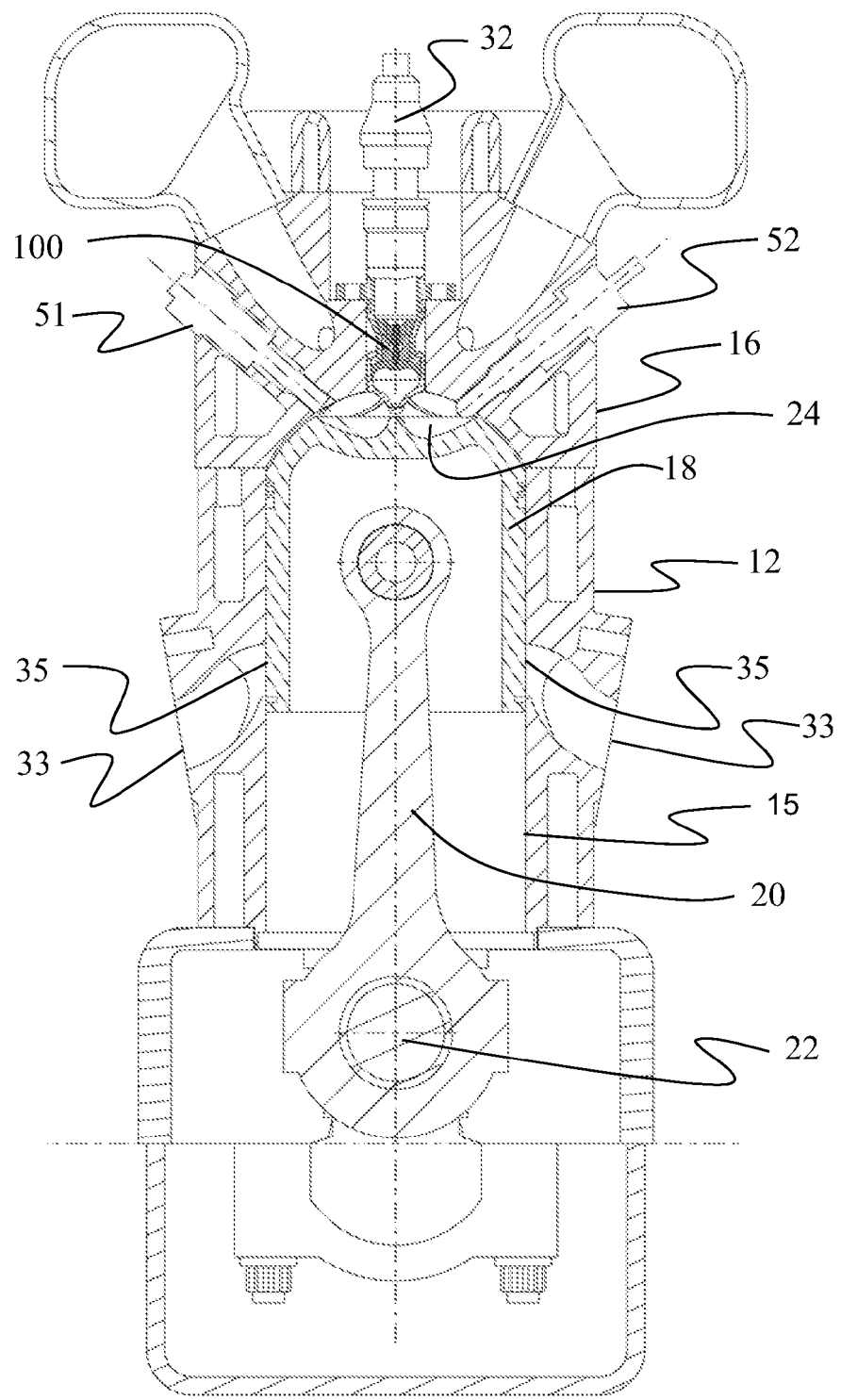
FIG. 1G is a second partially sectioned front view of the embodiment along lines 1G-1G of FIG. 1D.
Figure 1H:
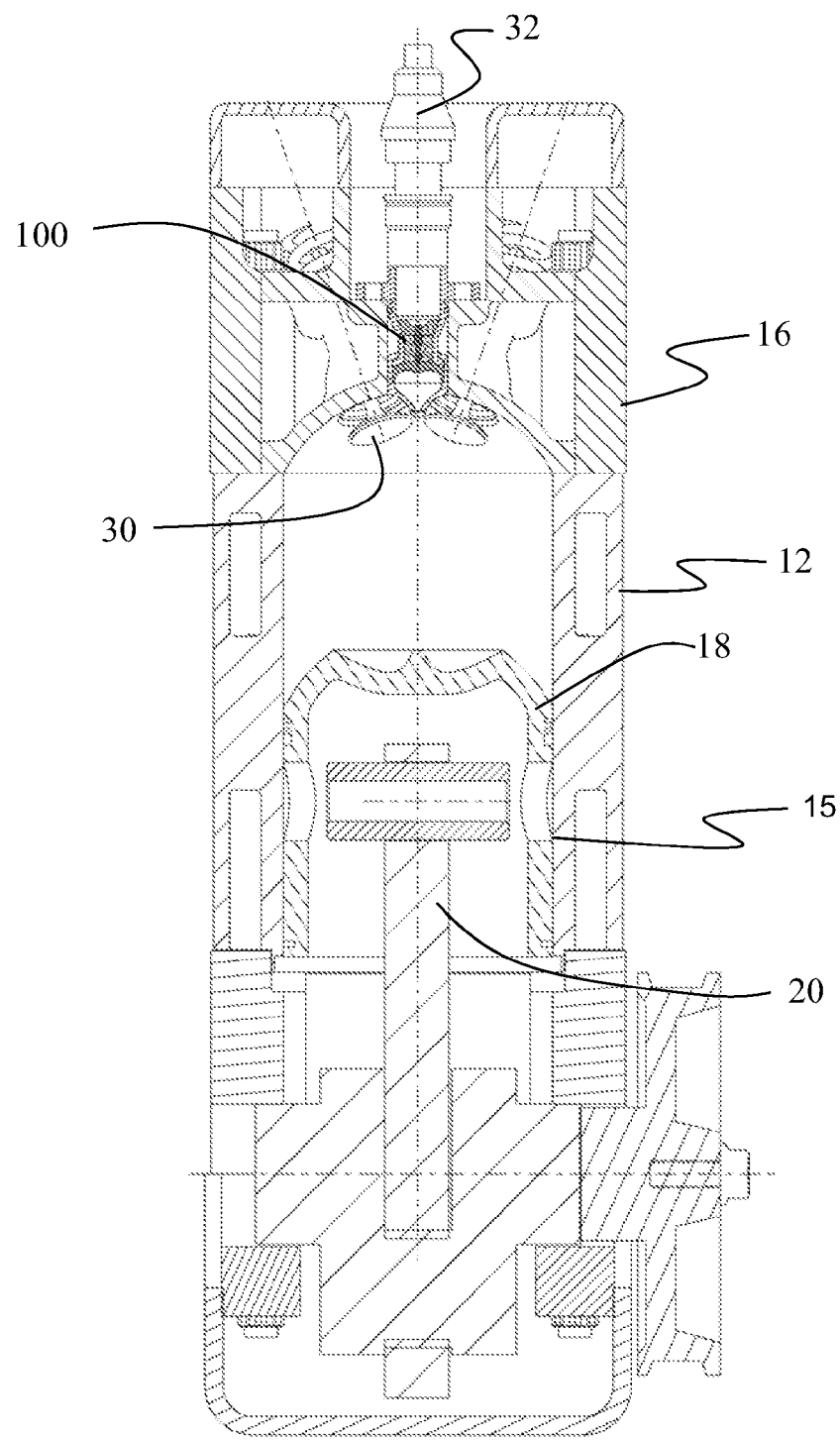
FIG. 1H shows a second partially sectioned side view of the embodiment with the piston in the bottom dead center position.
Figure 1I:
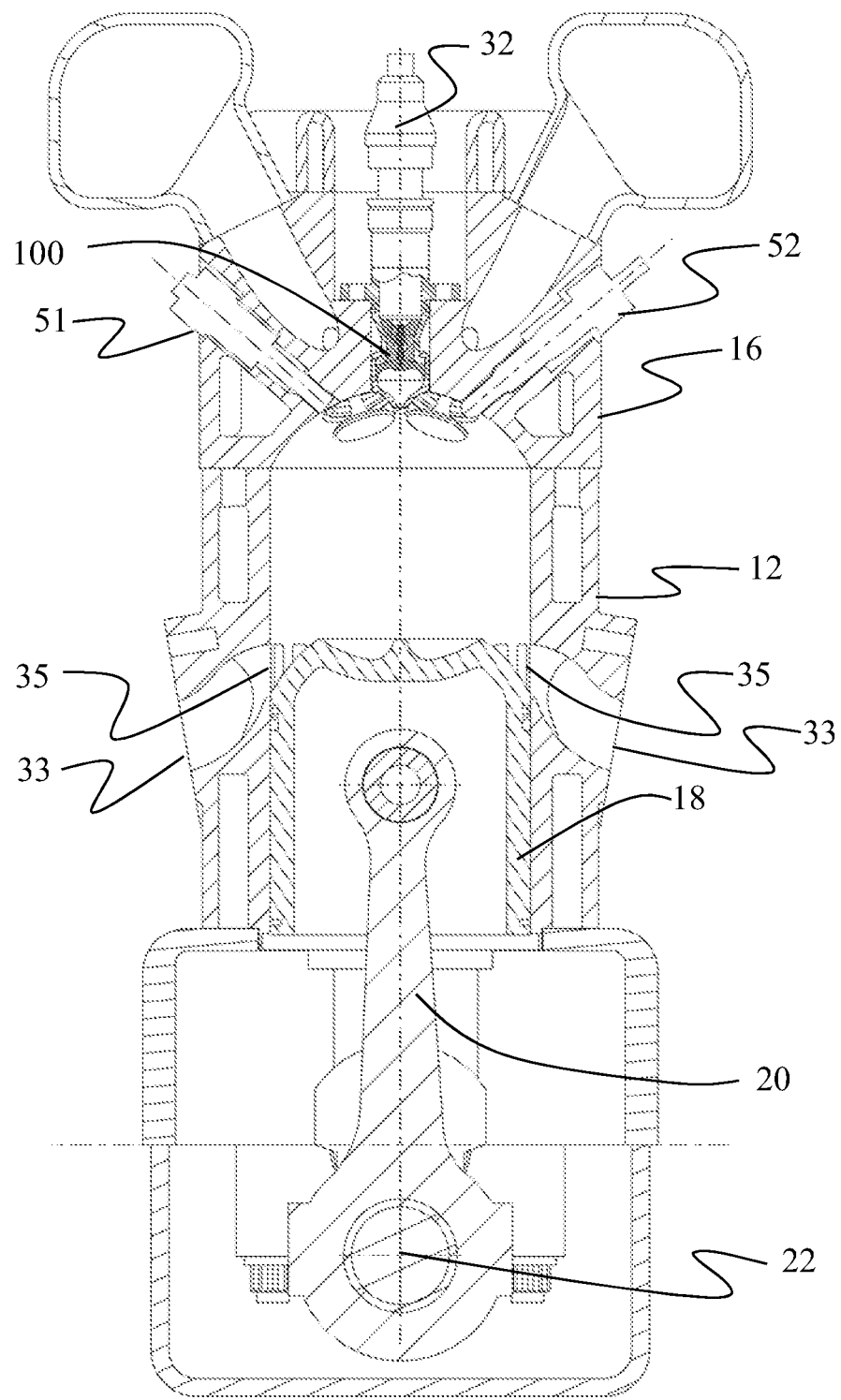
FIG. 1I shows the partially sectioned side front view of the embodiment with the piston in the bottom dead center position.

The engine has a two stroke operation with the intake, compression combustion and exhaust cycles occurring in the two strokes of the piston movement associated with each revolution of the crankshaft. As see seen in FIG. 1G, exhaust ports 33 having exhaust port apertures 35 are symmetrically placed in the cylinder wall 15 with respect to the bore axis 32. The exhaust port apertures 35 are exposed for flow of exhaust gas out of cylinder bore 14 as the piston 18 approaches bottom dead center (BDC) as seen in FIG. 1I.

Inlet ports 26 are positioned in the cylinder head 16 which terminate in inlet port orifices 28 in a combustion chamber 24, (to be described in greater detail subsequently) best seen in FIGS. 1E and 1F. The cylinder head 16 houses multiple inlet valves 30, four in the embodiment shown, which operably seal the orifices 28. The inlet valves 30 are symmetrically positioned with respect to an axis 32 of the cylinder bore 14 and are actuated in a direction substantially perpendicular to an upper surface 34 (best seen in FIGS. 2B and 2C) of the combustion chamber 24 to provide symmetrical flow, with respect to the cylinder bore axis 32, of pressurized oxidizer from the inlet ports 26 into the cylinder bore 14. A forced induction system employing a compressor, in exemplary embodiments preferably a supercharger, in a conventional manner provides the pressurized oxidizer to the inlet ports. Actuation of the valves in the embodiment shown is accomplished electromechanically with a solenoid 31. Alternative actuation of the valves including mechanical camshaft mechanisms as is known in the art, hydraulic or pneumatic systems may be employed in alternative embodiments. This configuration allows improved scavenging of the cylinder and enhanced volumetric efficiency of the engine. The scavenging system disclosed in the embodiments described herein is completely different from four-stroke Otto cycle engines, four-stroke Diesel cycle engines and two-stroke engines with crankcase-scavenging systems predominant in the prior art. Cylinder scavenging in these prior art engines is assisted by piston movement. In the embodiments herein cylinder scavenging is accomplished solely by the introduced oxidizer charge from the compressor in the forced induction system. This is significantly different from the prior art and opens new possibilities for increasing power, efficiency and improving emissions.

Inlet port orifices 28 and the exhaust port apertures 35 are positioned symmetrically with respect to the axis 32 to operatively provide forced cylinder scavenging with symmetrical flow resulting in efficient gas exchange. The unvalved configuration of the exhaust ports 33 allows significantly increased area for the exhaust port apertures 35.

Figure 2A:
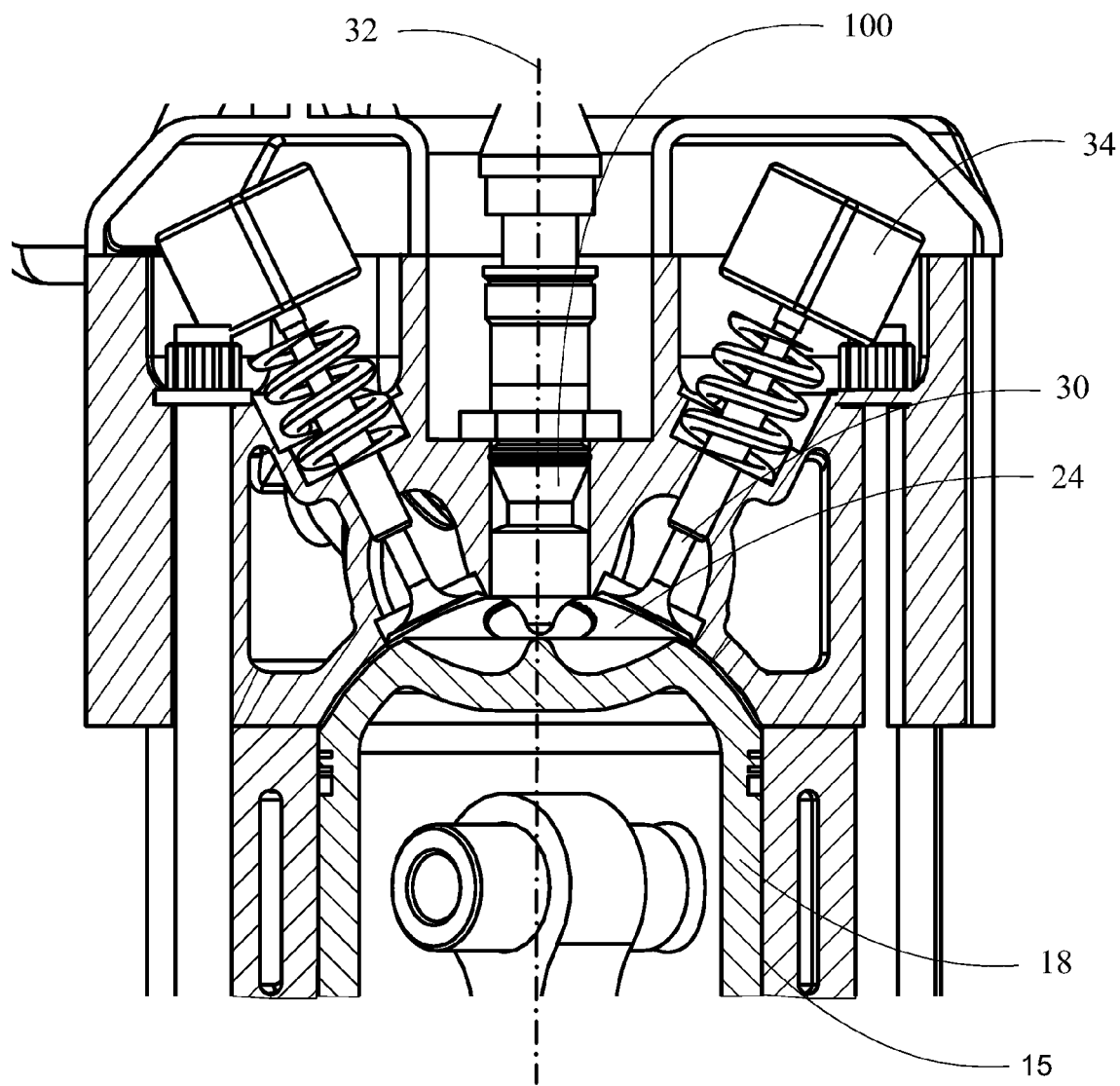
FIG. 2A is a detailed view of the combustion chamber, piston and upper portion of the cylinder as seen in FIG. 1E.
Figure 3A:
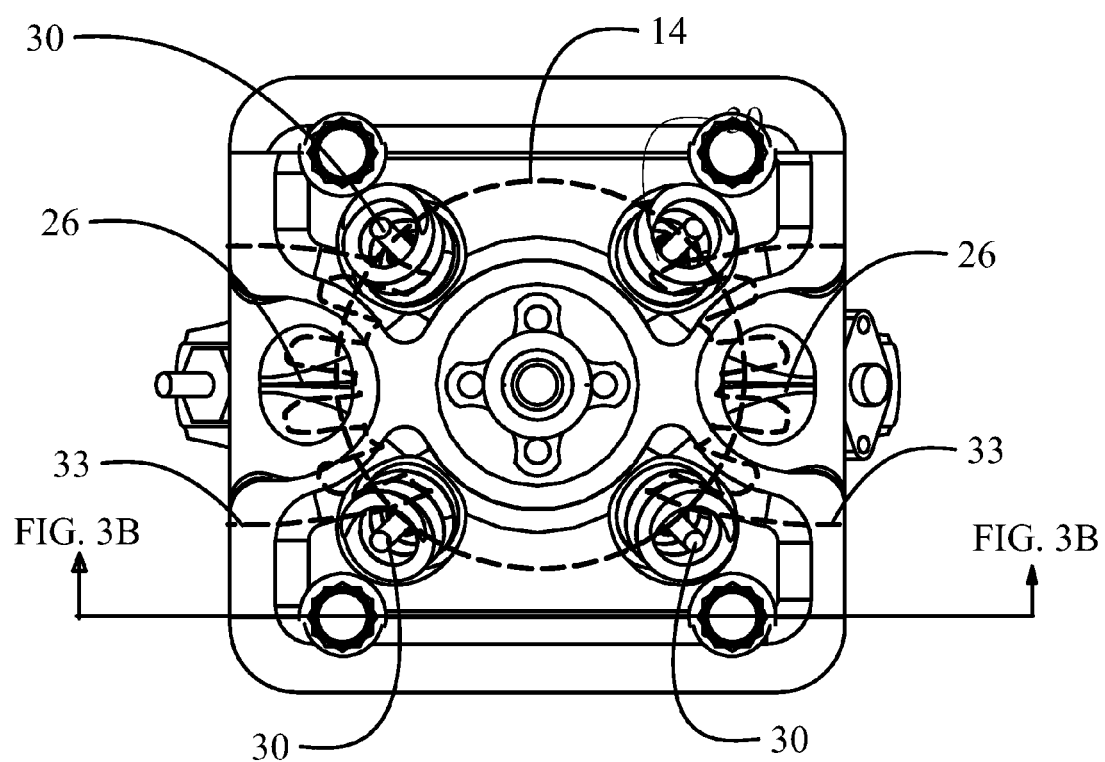
FIG. 3A is a top view of the valve components for the exemplary embodiment having two inlets from the manifold dividing into four inlet ports.
Figure 3B:
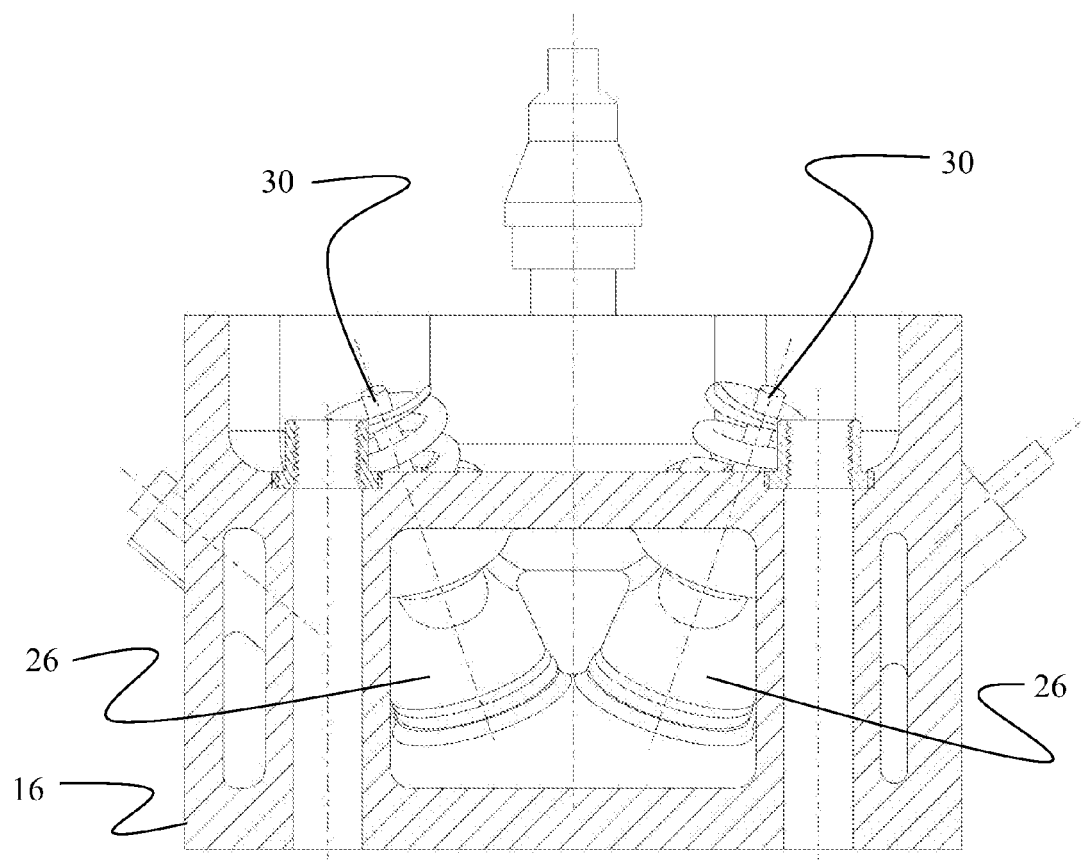
FIG. 3B is a partially sectioned view of the embodiment along lines 3B-3B of FIG. 3A.

The two-stroke operating cycle in the disclosed embodiment allows significantly greater area in the cylinder head for a greater number of inlet port orifices 28 and associated valves 30 for higher volumetric efficiencies. FIGS. 3A and 3B show the details of an exemplary arrangement with four valved inlet orifices 28 as also shown in FIGS. 1E-1I and 2A. The four inlet orifices 28 are symmetrically arranged about the cylinder bore axis 32 to provide even entry of pressurized oxidizer from the forced induction system. Additionally, as will be described in greater detail subsequently, the positioning of the inlet orifices 28 diagonally opposed with respect to associated exhaust ports 33 (best seen in FIG. 3A) promotes interoperability between the inlet ports and exhaust ports for scavenging of exhaust gases as the exhaust ports are opened and circulating or swirling of oxidizer entering the cylinder and being compressed by the piston for mixing with injected fuel, as will be described subsequently. Alternative configurations of inlet ports and valves including two valve arrangements and six or greater valve arrangements with symmetrical positioning about the bore axis 32 are anticipated.

The engine efficiency of the embodiments disclosed is greater than prior art engines employing either Otto cycle or four stroke Diesel cycle by employing cylinder scavenging driven completely by the compressor which has higher mechanical efficiency compared to the engine itself, which drives the scavenging system of the Otto and four stroke Diesel engines. As an example, a twin-screw supercharger has an efficiency up to 97% due to low internal friction by avoiding reciprocating masses and having fewer friction parts compared to Otto and Diesel cycle engines, which create cylinder scavenging as a reciprocating-piston pump.

The engine arrangement and two stroke cycle of the present embodiments further provides the ability to implement variable compression. Maximizing the total efficiency of the partially loaded engine can be further accomplished by decreasing compression to the optimum level at any given time, which varies based on the amount of injected fuel. The engine compression of the present embodiments depends on dynamic compression ratio, which depends on two engine parameters: whatever exhaust or intake ports latest closing timing settings and the pressure in the induction system. This pressure can be varied using valve-by-pass settings in the compressor or varying compressor rotational speed dependent on the amount of injected fuel into the engine. This will reduce the amount of oxidizer supplied to the engine and will lower compression with a tradeoff of combustoin thermal efficiency, resulting in greatly reduced compression pumping losses, which cannot be achieved in Diesel engines. This further reduces intake pumping losses, which will be less than not only Otto cycle engines, but Diesel cycle engines also; and even further will reduce engine load from the compressor by reducing work load of the engine. All of these effects in combination increase total engine efficiency.

Figure 4:
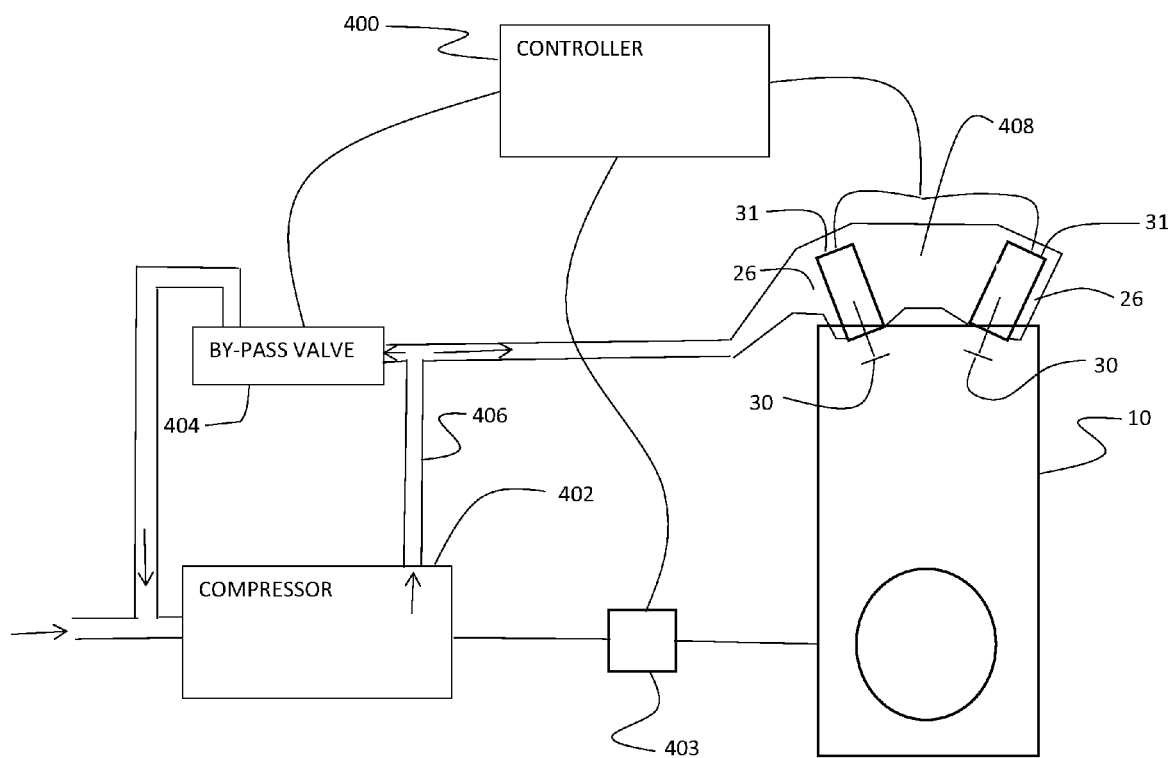
FIG. 4 is a schematic block diagram of the forced induction system and controller for variable compression.

As seen in FIG. 4, an engine controller 400 is employed for controlling pressure of the forced induction based on the volume of fuel introduced into the combustion chamber. Engine controller 400 may control pressure provided by a compressor 402. Compressor 402 may be mechanically driven by the engine 10 in a conventional manner or may be controllable through a clutch 403 or other comparable device for varying the speed of the compressor. In alternative embodiments the compressor may be electrically driven. A bypass valve 404 connects the outlet 406 of the compressor to an inlet manifold 408 that distributes the pressurized oxidizer to the inlet ports 26. Controller 400 regulates the bypass valve 404 to adjust the pressure of the oxidizer provided to the inlet manifold thereby providing an initial control of compression in the engine by determining initial pressure of the oxidizer charge before compression by the piston in the cylinder. While described herein as an electromechanical operator, a purely mechanical or pneumatic actuation system may be employed. Alternatively the controller 400 controls the speed of the compressor to vary pressure provided to the inlet manifold.

With reduced pressure of oxidizer in the inlet manifold 408, volumetric efficiency of the engine may also be enhanced by operating only a portion of the inlet valves thereby maintaining flow with optimum velocity levels of the inlet ports for greater volumetric efficiency at a given inlet pressure. In the exemplary embodiment with four inlet orifices and associated valves, as pressure is reduced from the compressor 402 by the controller 400, one, two or three of the valves may be controlled to remain closed during the intake cycle thereby reducing the total open area of the inlet orifices to maintain near optimum velocity in the open orifices. Additional control of the compression in the engine may be accomplished by controlling the timing of closure of the inlet valves 30 which may be delayed to decrease compression.

The engine of the present embodiment operates independently of fuel and oxidizer ratio, unlike Otto cycle engines, and is only limited by a minimum chemically correct ratio. Additionally, the present embodiment using injection of heated fuel above the critical point and particularly with adiabatic fuel injection, as described herein, allows ignition to be independent of temperature of the oxidizer unlike Diesel cycle engines. All of these features offer greatly improved engine efficiency, which cannot be achieved in engines in the known art.

The present engine may operate in multiple ignition modes. Ignition in the engine may be accomplished by compression-ignition (fuel injection into oxidizer thermodynamically heated in the compression cycle to above the self-ignition temperature of the fuel) or by injection-ignition (heating and pressurizing fuel above a critical point and then injecting the fuel into oxidizer in the combustion chamber). The injection ignition may be accomplished in the exemplary embodiment described herein using an adiabatic fuel injection process. The fuel conditioner and injector device 100 is positioned in the cylinder head 16. While shown as a separate integrated element portions of the conditioner and injector device 100 may be machined into or otherwise integrated with the cylinder head 16. As seen in FIGS. 1E-1F and in detail in FIGS. 2A-2C, 5A and 5B, the fuel conditioner and injector device 100 includes an upper portion 101 which incorporates actuating elements and connection to the liquid fuel delivery system as will be described in greater detail subsequently. A lower portion 102 has a vessel 105 having at least a portion of an exterior wall 104 as a heat absorbing surface exposed within the combustion chamber 24. The exterior wall 104 forms a portion of the horned toroidal surface of the combustion chamber.

Figure 2B:
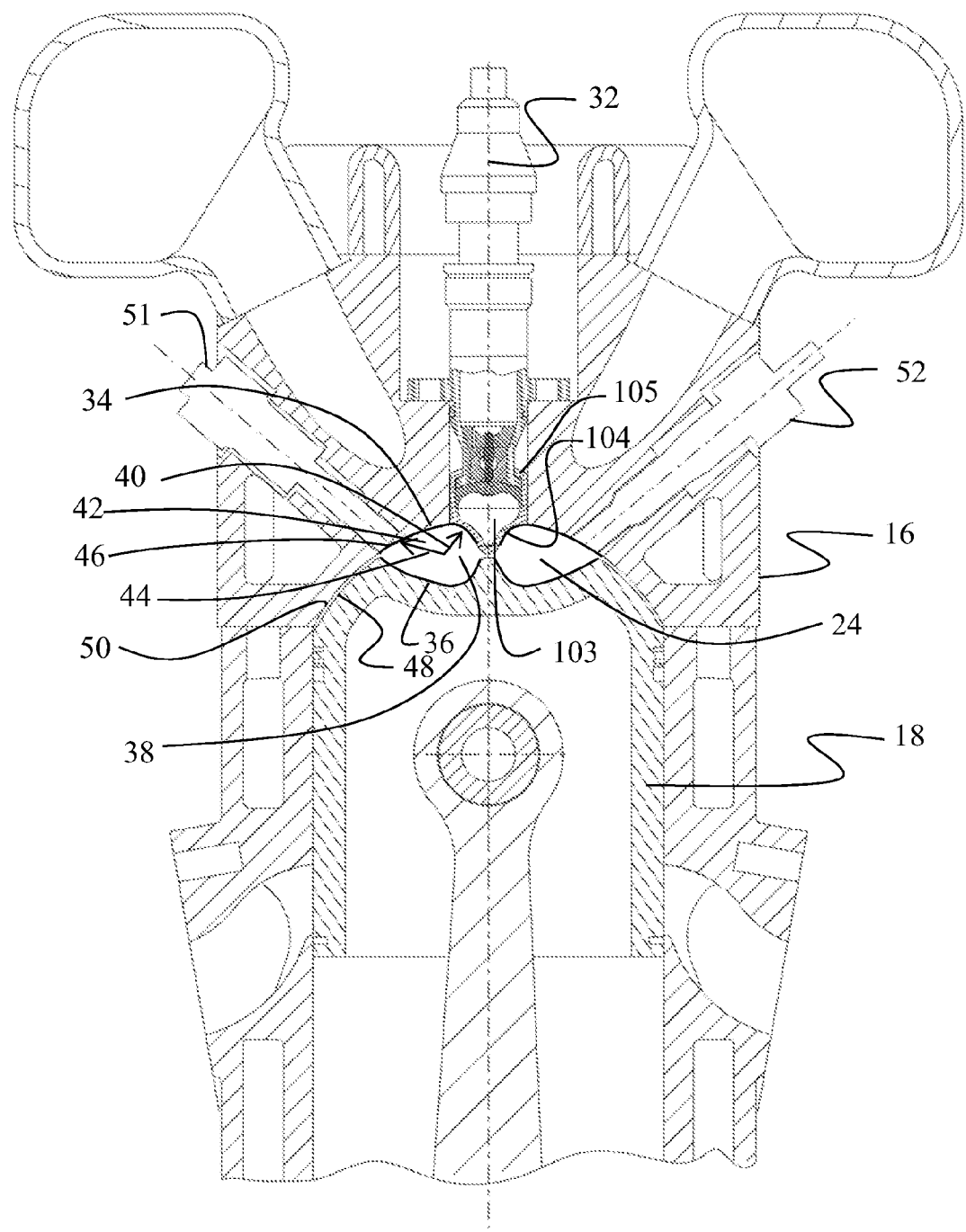
FIG. 2B is a detailed view of the combustion chamber, piston and upper portion of the cylinder showing the horned torus combustion chamber profile with valve components removed for clarity in showing the combustion chamber.
Figure 5A:
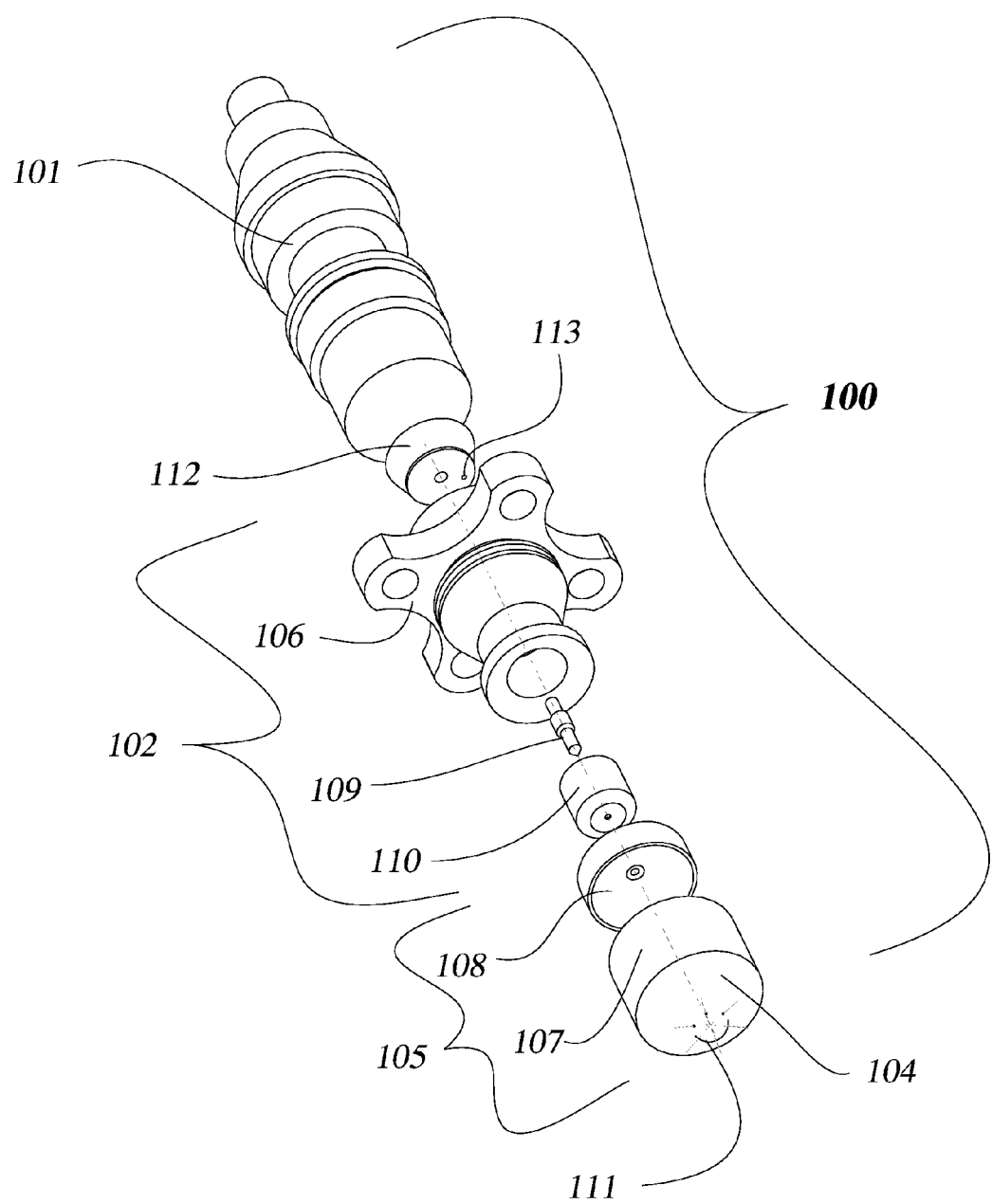
FIG. 5A is an isometric view of a first configuration of the fuel conditioner and injector device.
Figure 5B:
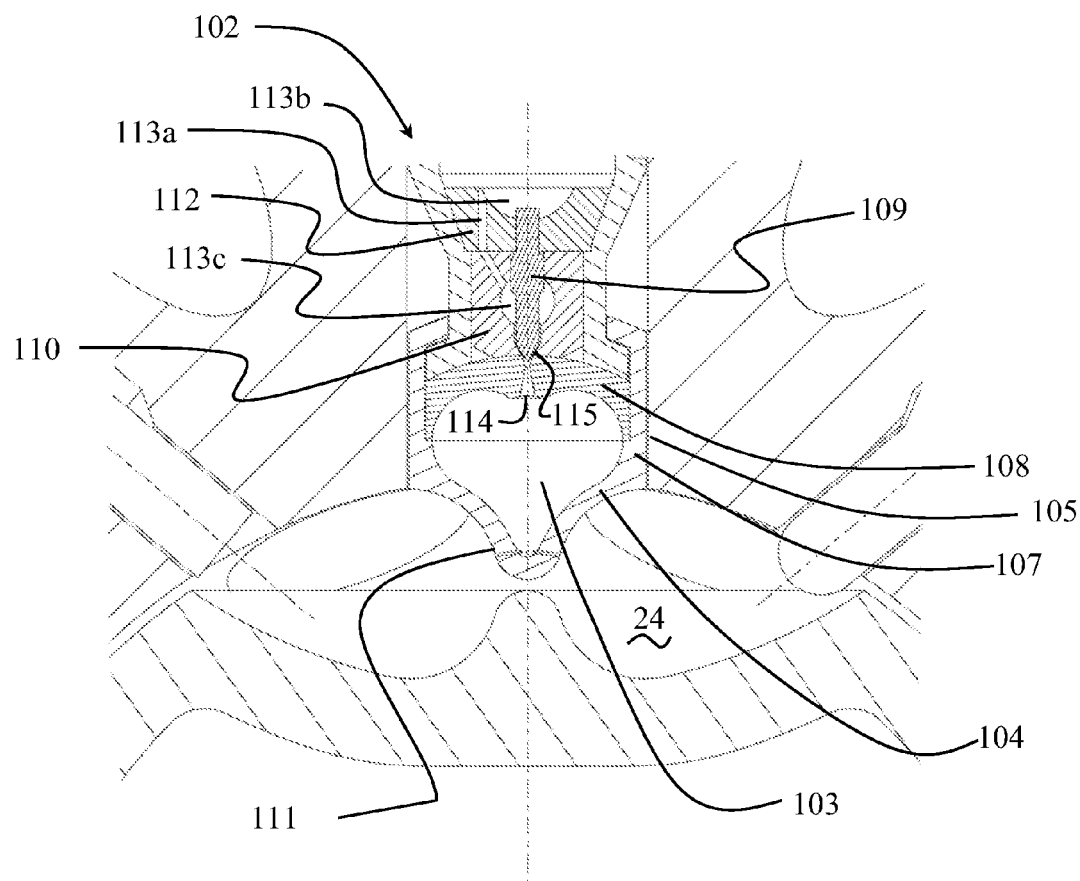
FIG. 5B is an enlarged side section view of the inlet nozzle and pin, and vessel of the fuel conditioner and injector device shown in FIGS. 2B and 5A.

As seen in FIGS. 2B, 5A and 5B for the first exemplary configuration, an expansion chamber 103 in the vessel 105 is formed in an exemplary embodiment by a lower portion 107 and a cap 108 integrated in the conditioner and injector device. In alternative embodiments, the vessel 105 may be a separate element or may be machined into the cylinder head 16. A pin 109 is constrained in a lower body 110 with an upper body 112. Liquid fuel from the fuel delivery system flows through an inlet conduit formed in the exemplary embodiment by a fuel inlet passage 113a from a fuel gallery 113b into a fuel injection volume 113c. The pin 109 operably seals a liquid fuel inlet nozzle 114 in the cap 108 which is in fluid communication between the fuel injection volume 113c and the expansion chamber 103. A seat 115 in the fuel inlet nozzle allows a mating seal with the pin 109. Open fuel injection passages 111 extend through the wall 104 from the expansion chamber 103 into the combustion chamber 24.

Details of a first configuration of the combustion chamber 24 are best seen in FIGS. 2A and 2B. Internal details of the inlet orifices have been removed in FIG. 2B for clarity in the shape of the combustion chamber. The shape of the combustion chamber 24 with the piston at TDC is a modified horned toroidal shape symmetrical with the cylinder bore axis 32. The upper surface 34 of the combustion chamber 24 is formed in the cylinder head 16 with a symmetrical lower surface 36 formed in the piston 18. An inner portion 38 has a substantially equal radius 40. An outer portion 42 of the combustion chamber tangentially extends from the inner portion to an outer diameter 44. The outer portion 42 for the configuration shown has an upper surface 46 substantially concentric with a spherical upper surface 48 of the piston 18. The upper surface 46 extends to a quench zone 50 with approximately 1 mm spacing from the piston upper surface 48 in the exemplary embodiment shown which gives minimum clearance to accommodate practical functionality of the engine. The quench zone 50 operates to induce mixing of the injected fuel with oxidizer in the combustion chamber 24 with rapid movement of the oxidizer as the piston approaches top dead center (TDC) in the compression cycle.

Figure 2C:
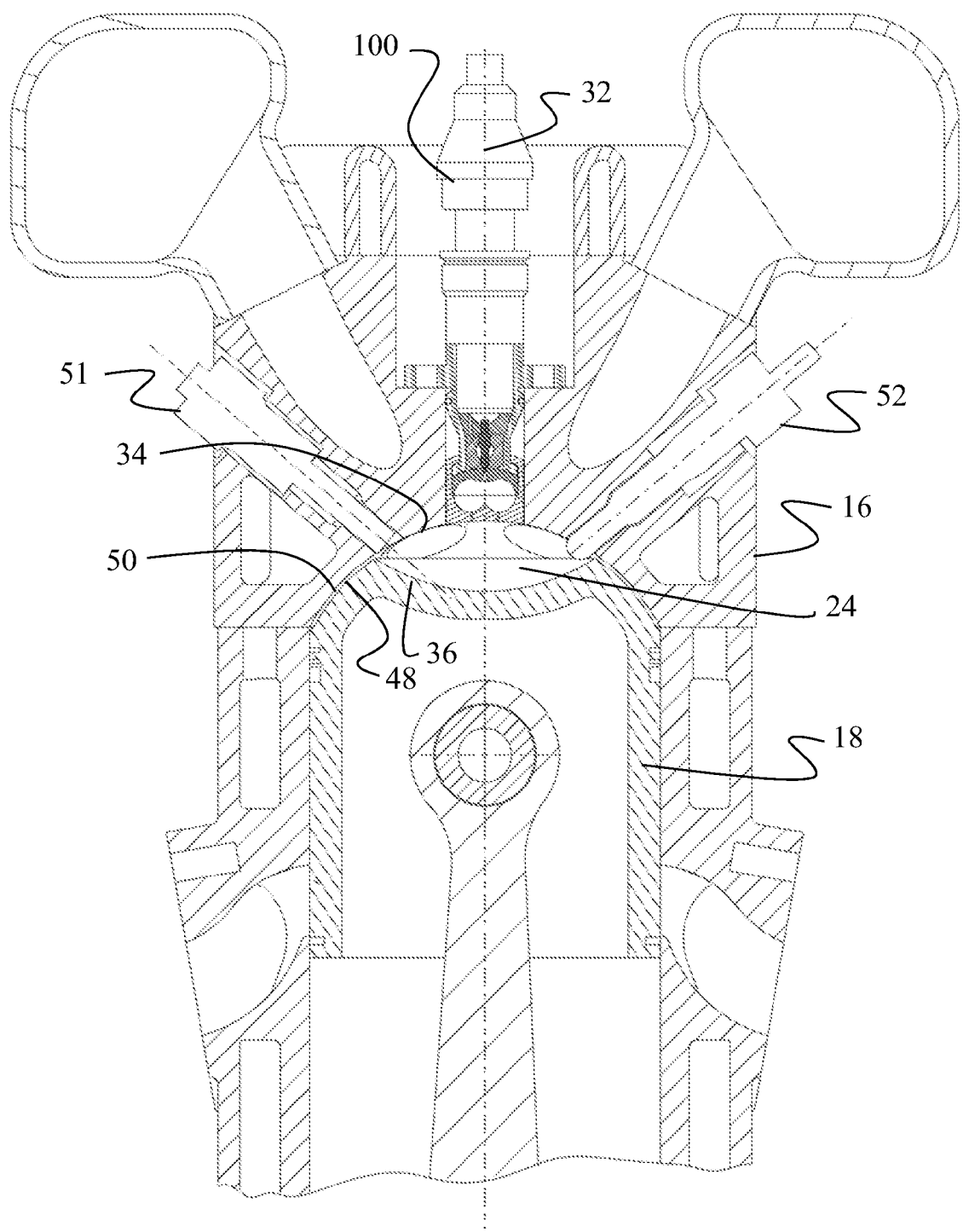
FIG. 2C is a detailed view of an alternative embodiment of the combustion chamber, piston and upper portion of the cylinder showing a modified spherical combustion chamber profile and fuel condition and injector device.

An alternative configuration of the combustion chamber 24 is shown in FIG. 2C. The shape of the combustion chamber for the second configuration is a joined spherical bight symmetrical with the cylinder bore axis 32. As in the prior configuration, the upper surface 34 of the combustion chamber 24 is formed in the cylinder head 16 with a symmetrical lower surface 36 formed in the piston 18. The upper surface 34 in the cylinder head is substantially spherical having an equal and substantially constant radius substantially concentric with the partial spherical upper surface 48 of the piston 18. The lower surface 36 is spherical cutout bight mirroring the upper surface 34. The upper surface 34 again extends into a quench zone 50 with approximately 1 mm spacing from the piston upper surface 48.

The engine combustion chamber configurations described have the ability to accept high compression ratios while the compact shape having low surface-to-volume ratio and centrally located in the cylinder bore provides a high level of mixing of fuel with oxidizer. The chamber also has a simple shape, wherein the cylinder head and piston crown can be machined in one operation in a matter several seconds at a very low manufacturing cost.

The combustion chamber is also surrounded by relatively large quench zone creating rapid oxidizer vertical rotational movement from all directions by having smooth surfaces with low friction. Distortion of the combustion chamber shape is avoided since valve relief requirements found in the four-stroke engines are not necessary. Also the embodiments implement radial positioning of valves in the cylinder head as a part of the surface of the combustion chamber and having matching surfaces substantially tangential to the surface of the combustion chamber as may be seen in FIG. 2A.

When the piston approaches TDC, the volume of the quench zone decreases more rapidly compared to the combustion chamber volume. This creates a difference in pressures, which is greater in the quench zone, resulting in rapid motion of the oxidizer to the center of the combustion chamber, sweeping injected fuel. The greater mixing process in the combustion chamber is further improved by employing the previously described adiabatic fuel injection system, wherein fuel is injected above critical point, providing about four times greater mixing capabilities with the oxidizer compared to injection of liquid fuel at environmental temperature.

Further, to improve combustion thermal efficiency, the cylinder head and piston crown of the present embodiment can be thermally coated with zirconium oxide for example, which is not favorable in Otto cycle engines, where fuel is contacting the combustion chamber during the compression cycle. Thermally coated surfaces have elevated temperatures, which increases the possibility of pre-ignition in these engines.

Figure 5C:
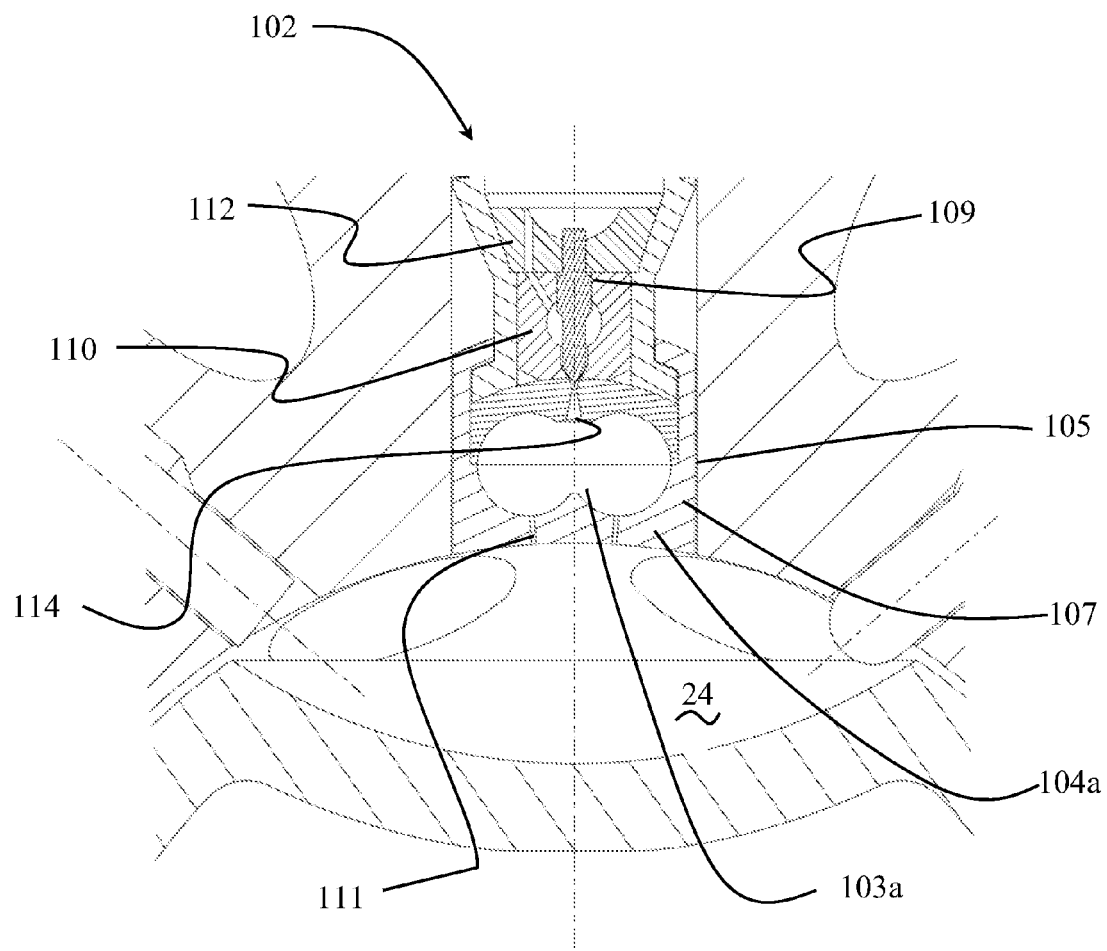
FIG. 5C is an enlarged side section view of a second configuration of the inlet nozzle and pin, and vessel of the fuel conditioner and injector device show in FIG. 2C.

As seen in FIGS. 2C and 5C for the second configuration of the combustion chamber, the fuel conditioner and injector device 100 has a modified configuration. The exterior wall 104a is again shaped to provide a portion of the upper wall of the combustion chamber. Total surface area of the wall 104a and the relative sizing of the expansion chamber 103a allow operation of the conditioner and injector device 100 as will be described in greater detail subsequently. The open fuel injection passages 111 extend through the wall 104a from the expansion chamber 103a into the combustion chamber 24.

For both exemplary configurations, the lower portion 107 of the vessel 105 and the exterior wall 104 are shaped and sized to provide desired amount of absorption of heat from the combustion chamber 24 during operation of the engine 10 and transfer of that heat for adiabatic pressurization of a fuel charge provided through the inlet nozzle 114. The exterior wall 104 additionally provides a continuation of the equal radius inner portion of both the modified horned toroidal shape of the combustion chamber 24 in the first configuration and the joined spherical bight of the combustion chamber in the second configuration. The vessel 105 and exterior wall 104 are centrally located in the combustion chamber 24 for even distribution of conditioned fuel through the open fuel injection passages 111 into the combustion chamber. The vessel 105 as a whole or the lower portion 107 may be fabricated from or coated with titanium to withstand high temperatures and for strength and corrosion resistance. For the first configuration of FIGS. 2A, 2B, 5A and 5B, the lower portion 107 and exterior wall 104 constitute a rounded nipple extending into the combustion chamber 24. For the second configuration of FIGS. 2C and 5C, the lower portion 107a and exterior wall 104a constitute a portion of the upper wall of the spherical inner portion of the combustion chamber. In alternative embodiments a hemispherical shape or other geometric protrusions may be employed. The interior expansion chamber 103 of the vessel 105 is shaped with a torus in the cap 108 blending into substantially a cone shape in the lower portion 107 to enhance mixing of the fuel injected into the expansion chamber through inlet nozzle 114. Fuel injected into the cone shape is reflected upwards into the torus shape which then recirculates the fuel charge creating mixing within the entire expansion chamber to facilitate conditioning of the fuel.

Figure 6A:
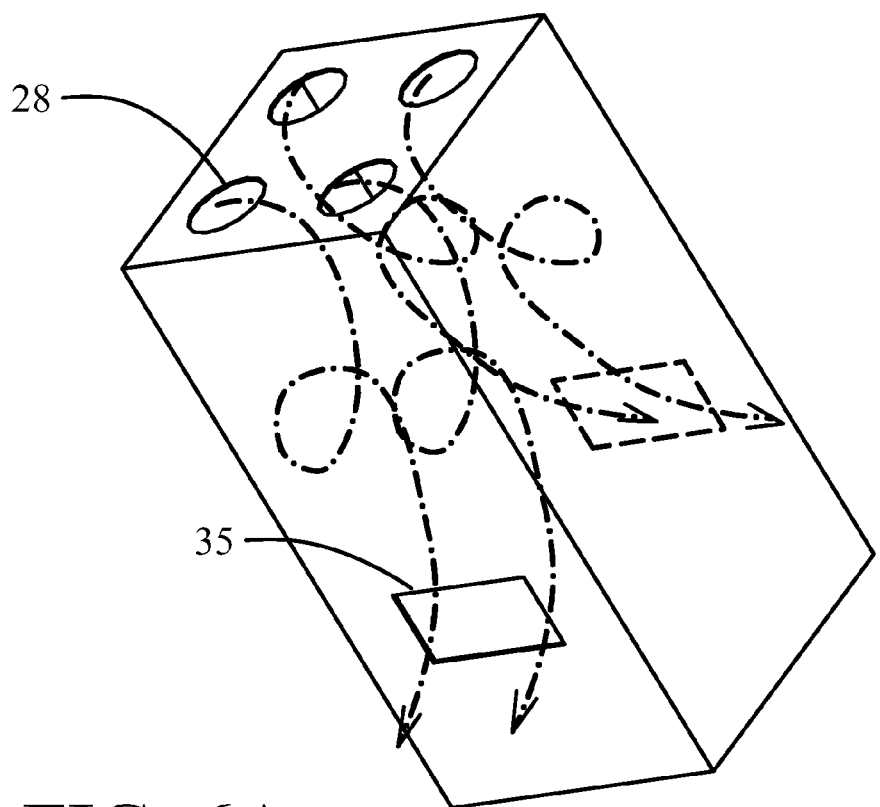
FIG. 6A is a perspective representation of a first configuration of valved inlet ports and unvalved exhaust ports for symmetrical operative flow.
Figure 6B:
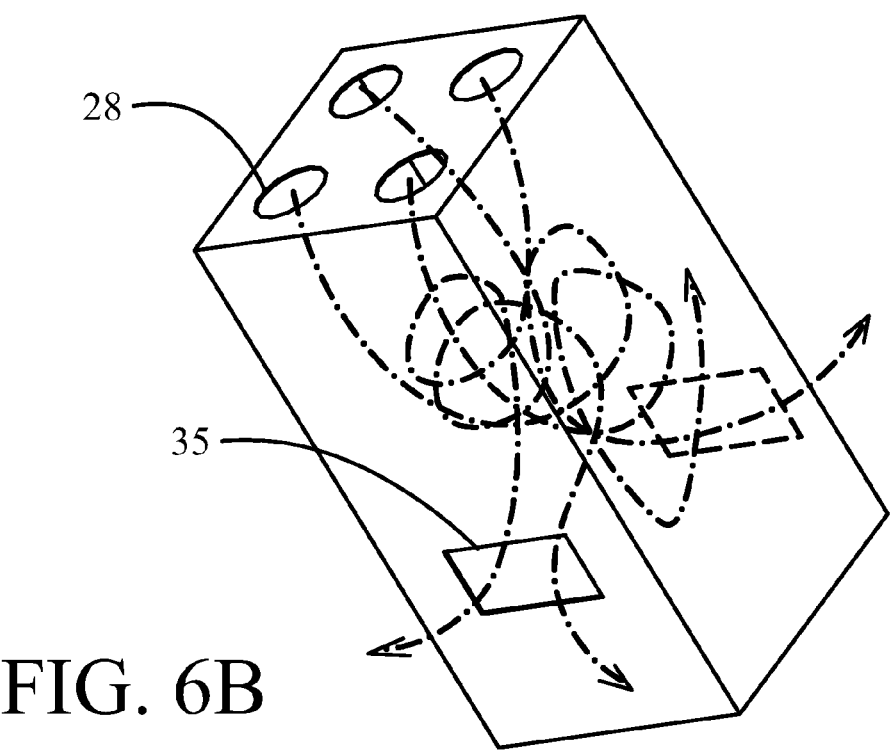
FIG. 6B is a perspective representation of a second configuration of valved inlet ports and unvalved exhaust ports for helical symmetrical operative flow.

Symmetrical placement of the inlet valves 30 and associated inlet port orifices 28 with respect to the cylinder bore axis 32 and relative symmetrical placement of the inlet port orifices 28 and the exhaust port apertures 35 allows highly efficient scavenging of the cylinder by oxidizer introduced by the forced induction system. The angle of introduction of oxidizer into the cylinder bore may provide a matched vertical circulating flow from the inlet port orifices to the associated exhaust orifice as shown in FIG. 6A or a helical flow to opposing exhaust port apertures as shown in FIG. 6B.

Figure 6C:
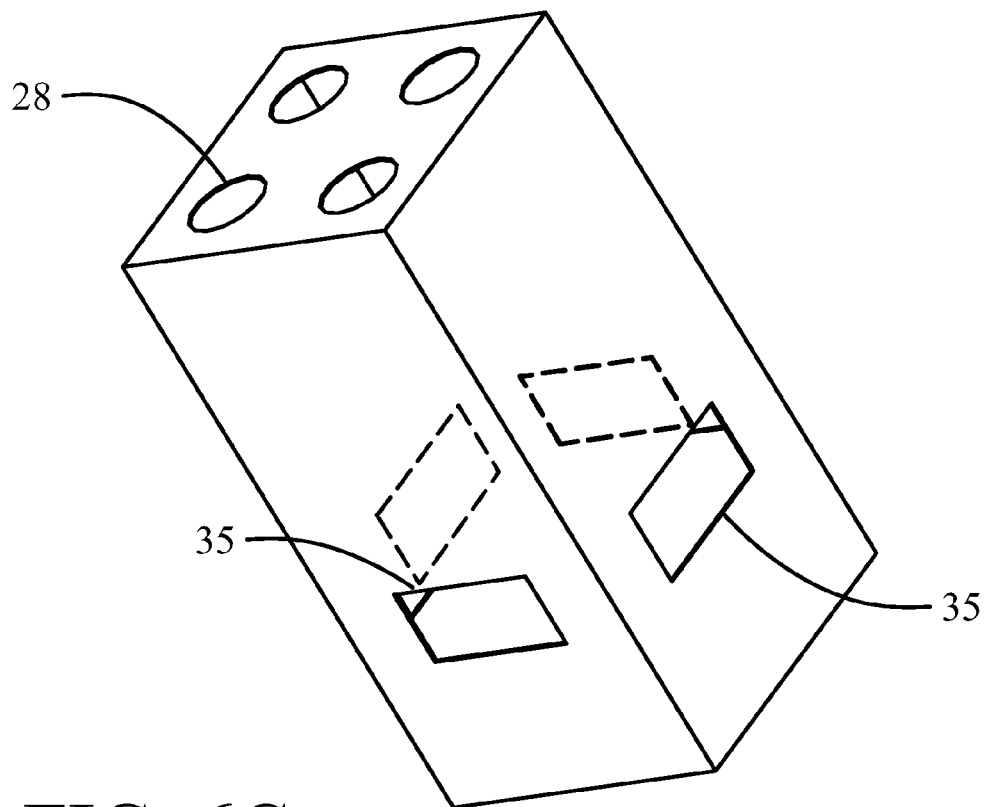
FIG. 6C is a perspective representation of a third configuration of valved inlet ports and unvalved exhaust ports wherein the number of unvalved exhaust ports equal the number of valved inlet ports and the exhaust ports are vertically aligned with the valved inlet ports.
Figure 6D:
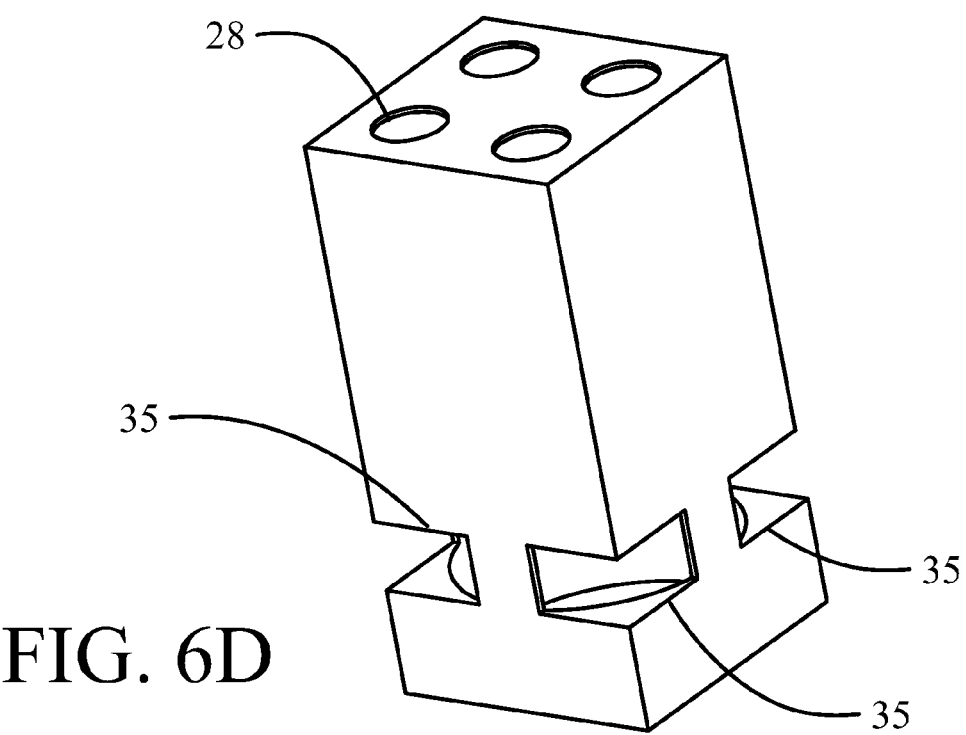
FIG. 6D is a perspective representation of a fourth configuration of valved inlet ports and unvalved exhaust ports wherein the number of unvalved exhaust ports equal the number of valved inlet ports and the exhaust ports are helically aligned with the valved inlet ports.

As seen in FIG. 6C, increasing the number of unvalved exhaust apertures 35 with symmetrical placement of the exhaust port apertures with the inlet port orifices provides improved scavenging of the cylinder with increased volumetric efficiency.

An exemplary embodiment of the engine embodiment incorporates one cylinder with a swept volume of 600 cc having 96 mm bore and 82 mm stroke. Engine fuel type is 103 octane gasoline. During operation cylinder pressures for the exemplary embodiment reach a maximum of approximately 3.59 MPa (520 psi) during the compression cycle. Temperatures generated by the combusting fuel/air charge reach approximately 4,000° F. The engine has a maximum operating condition of 7,000 RPM employing a fuel charge of 3.0 cubic mm ($10^{-3}$ ml). Heating of the vessel 105 by the cylinder combustion to at least 1000° F. is desirable with approximately 2,500° F. being reached with the engine operating at maximum RPM with full fuel charge. Volume of the expansion chamber 103 in the vessel 105 is larger than the volume of injected liquid fuel and for the exemplary embodiment is 1766 cubic mm (1.766 cc) in the exemplary embodiment to accommodate the 3.0 cubic mm liquid fuel volume for injection and provide sufficient volume for adiabatic pressurization of the fuel charge for injection. Using the first configuration of the combustion chamber as an example, the surface area of the wall 104 of the vessel 105 is 440 $mm^2$ to provide the necessary heat transfer from the combustion chamber to the expansion chamber 103 to achieve the adiabatic conditioning of the fuel beyond the critical point. The fuel delivery system providing liquid fuel to the fuel inlet passage 113a operates in the exemplary engine at 24.1 MPa (3500 psi) A minimum operating pressure of the fuel delivery system of at least 4 MPa (580 psi) (approximately 12% over maximum cylinder compression pressure) is desirable and exemplary systems may operate at between 4.13 MPa (600 psi) and the present example operating pressure of 24.1 MPa. The liquid fuel inlet nozzle 114 sealed by pin 109 has a diameter of 0.4 mm for the exemplary embodiment to achieve injection of the liquid fuel within the desire time delay. Operation of the pin 109 may be accomplished by electromechanical components in the upper portion 101 of the conditioner and injector device 100 such as a solenoid or piezo element operated by a microcomputer controller to achieve desired opening and closing of the liquid fuel inlet nozzle 114 by the pin 109. Six open fuel injection passages 111 from the expansion chamber 103 in the vessel 105, each with a diameter of 0.22 mm, are employed in the exemplary embodiment giving a total area of 0.23 $mm^2$. This area is optimized for the exemplary embodiment to allow oxidizer charge admission into the expansion chamber 103 during the compression cycle for creating radicals in the fuel during conditioning to create a hyper fuel state and to allow injection of the conditioned fuel over the desired time period for combustion as described in detail below.

Operation of the engine is best described in terms of timing based on rotation of the crank shaft. Operating at 7,000 RPM, the crank shaft transits 1° of angular rotation in 23.8 microseconds. For maximum efficiency, combustion of the fuel charge occurs over a desired range between 20° and approximately 50° after TDC. This results in a desired combustion time of 714 microseconds. Fuel introduced into the expansion chamber 103 must have sufficient time to expand and pressurize with resulting injection through the fuel injection passages and timing must accommodate ignition delay. Projected combustion maximum pressures occur at approximately 30° after TDC. Adiabatic pressurization of the fuel charge in the expansion volume provides a peak injection pressure which then decays during injection of the conditioned fuel into the cylinder. The volume of the expansion chamber 103 is designed to be much greater then volume of the injected fuel. The pressure in the expansion chamber from adiabatic expansion of injected fuel absorbing heat and partially oxidizing (as will be described subsequently) depends also on the expansion chamber volume. A smaller volume of the expansion chamber and higher temperature creates higher peak pressure in the expansion chamber and also will reduce the time of the fuel injection into combustion chamber, which will reduce combustion time. Sizing of the expansion chamber 103 is determined to create the desired pressure and temperature above the critical point for the fuel with the projected combustion rate.

Based on the structure described for the exemplary embodiment, the injection time of the liquid fuel injection into expansion chamber 103 calculated based on operating pressure of the fuel supply system, the amount of maximum fuel volume of 3 cubic mm, size of the liquid fuel inlet nozzle 114 and fuel environmental temperature is approximately 119 microseconds, which equals around 5° rotation of the crankshaft at 7,000 RPM. It should be noted that the injection time into expansion chamber (119 microseconds) must be less than a delay time of the increasing pressure in the expansion chamber to the equal the pressure supply system for preventing back flow of the fuel and sizing of the fuel inlet nozzle is determined to allow completion of the liquid fuel injection within that constraint. The injector nozzle pin 109 must be closed to seal the liquid fuel inlet nozzle 114 before of the pressure in the expansion chamber 103 exceeds the fuel supply delivery pressure. In the exemplary embodiment expansion of the fuel charge takes approximately 345 microseconds to increase to 3.59 MPa (520 psi). The 119 microseconds of the injection time for the liquid fuel into expansion chamber therefore avoids any backflow of fuel from the expansion chamber into the fuel supply system. Within the 345 microseconds, the fuel charge is conditioned above the critical point and creation of radicals to provide the hyper fuel state occurs within approximately the last 60 microseconds (2.5° of crank rotation)

When the pressure in the expansion chamber exceeds the 3.59 MPa (520 psi) threshold equal to compression pressure of the oxidizer charge in the engine, "self-injection" of conditioned fuel automatically commences through the open fuel injection passages 111 from the expansion chamber 103 into the combustion chamber 24. To accommodate the delay time, 345 microseconds, for the fuel charge to expand and pressurize in the expansion chamber for initiating injection, opening of the injection nozzle pin 109 must occur 15° prior to the desired commencement of combustion starting point at 20° after TDC. Additionally, a combustion delay of approximately 12 microseconds or 0.5° of crankshaft rotation must be accommodated. Liquid fuel injection into the expansion chamber is previously noted as 119 microseconds or 5° of rotation which occurs within the 14.5° required for the fuel charge pressurization to 3.59 MPa (520 psi). Therefore, in the exemplary embodiment, initiation of the liquid fuel injection by opening of the injection nozzle pin 109 must occur at approximately 5° after TDC. Area of the open fuel injection passages is determined to create a combustion rate providing the desired fuel combustion cycle between 20° and 50° of crankshaft rotation in the example engine.

The open fuel injection passages 111 provide an additional benefit in that during the compression cycle of the oxidizer charge, compressed oxidizer is forced through the passages into the expansion chamber 103 to provide oxygen for creation of radicals in the fuel charge as the fuel is injected into the expansion chamber and is adiabatically pressurized and conditioned to a state above the critical point for the fuel. The oxidizer charge in a conventional engine may be pressurized air or may include injected nitrous oxide or other additive containing oxygen for enhancing performance. The total opening of the passages which communicate between the expansion chamber and the combustion chamber is determined such that a desired amount of compressed oxidizer is introduced from cylinder during the compression cycle. Partial oxidation of the fuel injected into expansion chamber will energize the fuel by creating molecules in radical formation therein without diluting fuel energy, which would lower the combustion efficiency. This operation allows the exemplary embodiment of the engine to operate as an injection-ignition engine wherein the ignition and following combustion occurs from oxidizing of heated fuel to a state above a critical point in the high concentration of oxygen, and that combustion event is independent of temperature of the oxidizer. This method of operation also greatly reduces or completely illuminates carbon coke formation of the fuel which has been conditioned to hyper fuel with molecules in radical formation, which may cause clogging injector nozzles and fuel passages. The introduction of fuel radicals into oxidizer present in the combustion chamber occurs substantially immediately upon fuel activation and transformation into the radical state, which prevents carbon coke formation.

For engine operation at the medium and lower RPM, all fuel injection requirements described above are adjusted automatically for normal operation of the engine. Because the engine operates from regulated amount of the injected fuel, a lower fuel volume results in less combustion temperature, a lower volume of oxidizer injected into expansion chamber, less heat transfer to the fuel and less pressure in the expansion chamber, lower engine RPM with more combustion time at approximately the same desire range between 20° and 50° of crankshaft rotation for the combustion process to maintain the combustion maximum pressure at 30°.

For the exemplary embodiment, cold start conditions of the engine may be accommodated by a cold start fuel injector 51 and glow plug 52 as seen in FIGS. 1G, 1I, 2B and 2C to allow temperature stabilization of the engine for conditioning of the vessel 105 to provide appropriate temperatures for heating and expanding fuel in the expansion chamber 103. Alternatively electrical coils (not shown) may be placed inside the expansion chamber 103 to augment the heating capability of the vessel 105.

Figure 7:
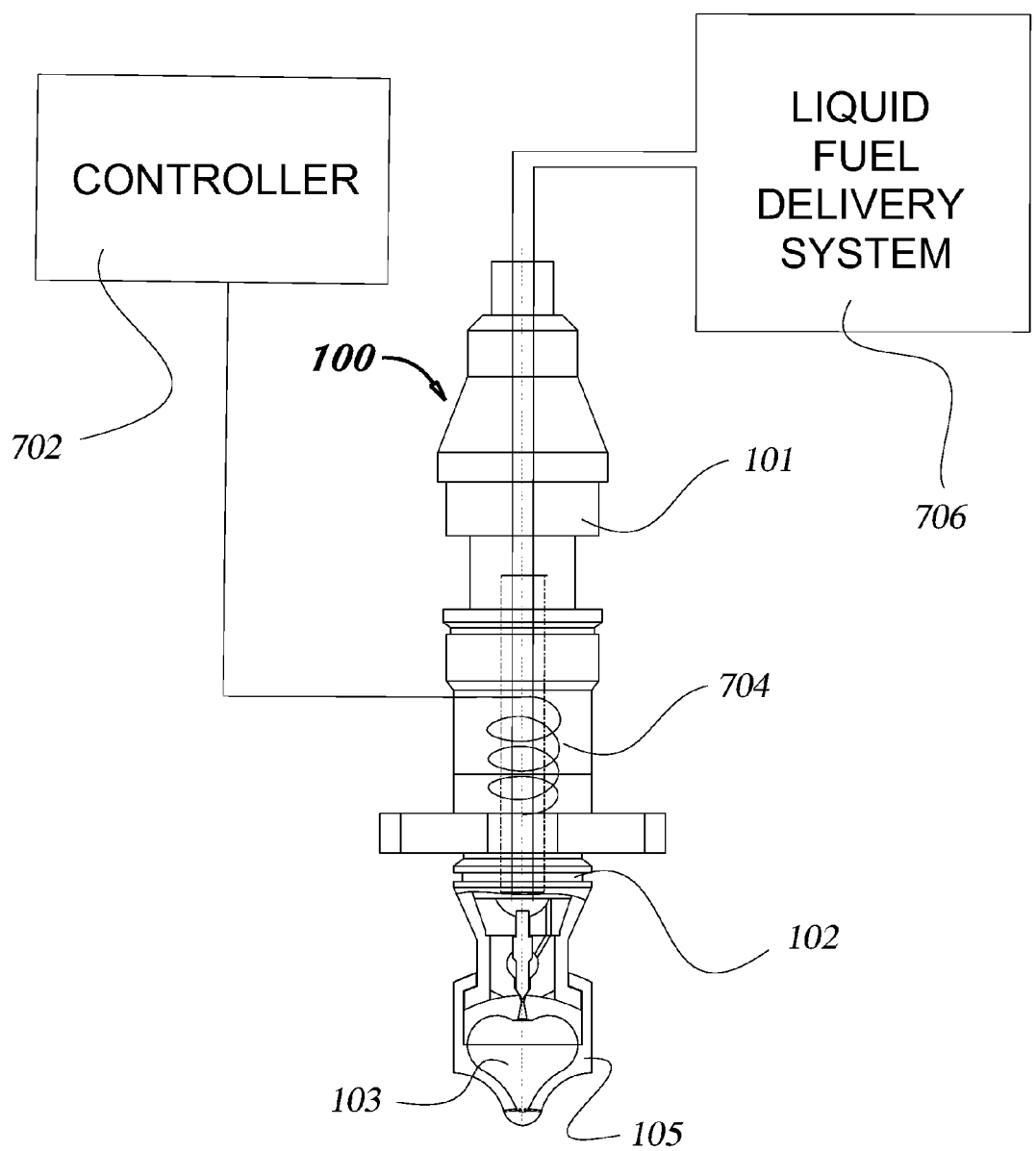
FIG. 7 is a block diagram of the engine control system for the for fuel injection in the embodiment disclosed.

As seen in FIG. 7, an engine controller 702 (which may be a common central processing unit with the controller 400 seen in FIG. 4 for compression control), provides timing control for the injection of fuel into the expansion chamber 103 by the pin 109. The engine controller is operable connected to an electromechanical operator 704 such as a solenoid or piezo actuator in the upper portion 101 of the fuel conditioner and injector 100. Upon powering of the operator 704, pin 109 is displaced from the seat 115 to open the nozzle 114 (as seen in FIG. 5B) allowing liquid fuel from the pressurized liquid fuel supply system 706 connected through the gallery 113b through fuel passage 113a to be injected from the injection volume 113c into the expansion chamber 103 (as previously described with respect to FIG. 5B). While described herein as an electromechanical operator, a purely mechanical actuation system may be employed.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A two-stroke reciprocating piston engine comprising:
a cylinder having a cylinder bore and a cylinder wall;
a cylinder head mounted to said cylinder;
a piston mounted in the cylinder bore for reciprocating motion between a top dead center position and a bottom dead center position
a combustion chamber, defined by a crown of the piston at top dead center and the cylinder head, said combustion chamber symmetrically shaped and centrally located in the cylinder bore symmetrical with respect to an axis of the cylinder bore;
at least two valved inlet ports having orifices positioned in the cylinder head symmetrically with respect to the axis, said inlet port orifices connected to receive pressurized oxidizer charge;
at least two unvalved exhaust ports having apertures positioned in the cylinder wall symmetrically with respect to the axis, said exhaust port apertures exposed with the piston proximate the bottom dead center position and operatively positioned with respect to the at least two valved inlet port orifices for forced gas exchange in the cylinder; and,
at least one fuel injection device introducing fuel into the combustion chamber symmetrically with respect to the axis.

2. The two-stroke reciprocating piston engine as defined in claim 1 wherein a first opposing surface on the crown of the piston and a second opposing surface on the cylinder head are relieved to form the combustion chamber with a horned toroidal shape, having an inner portion of substantially constant radius and an outer portion tangentially extending from the inner portion to an outer diameter.

3. The two-stroke reciprocating piston engine as defined in claim 2 wherein an upper surface of the outer portion of the combustion chamber is concentric with a spherical upper surface of the piston.

4. The two-stroke reciprocating piston engine as defined in claim 2 wherein the piston crown and cylinder head are spaced at the piston top dead center position to form a quench zone extending from a wall of the cylinder and terminating in the outer portion of the combustion chamber.

5. The two-stroke reciprocating piston engine as defined in claim 1 wherein a first opposing surface on the crown of the piston and a second opposing surface on the cylinder head are relieved to form the combustion chamber with mating opposed spherically shaped segments.

6. The two-stroke reciprocating piston engine as defined in claim 5 wherein an upper surface extending from the combustion chamber is concentric with a spherical upper surface of the piston.

7. The two-stroke reciprocating piston engine as defined in claim 5 wherein the piston crown and cylinder head are spaced at the piston top dead center position to form a quench zone extending from a wall of the cylinder and terminating in the combustion chamber.

8. The two-stroke reciprocating piston engine as defined in claim 1 wherein the at least one fuel injection device comprises an adiabatic fuel injector.

9. The two-stroke reciprocating piston engine as defined in claim 8 wherein the adiabatic fuel injector receives oxidizer for partial oxidation of fuel received in the adiabatic fuel injector prior to injection of fuel into the combustion chamber.

10. The two-stroke reciprocating piston engine as defined in claim 8 wherein the adiabatic fuel injector adiabatically conditions fuel to a state above a critical point.

11. The two-stroke reciprocating piston engine as defined in claim 8 wherein the adiabatic fuel injector comprises:
- a vessel having a wall exposed within the combustion chamber to be heated by combusting fuel, said vessel encompassing an expansion chamber and having at least one open fuel injection passage through the wall into said combustion chamber;
- an inlet conduit receiving liquid fuel at a predetermined pressure from a fuel delivery system;
- a nozzle interconnecting the inlet conduit and the expansion chamber;
- a pin operably sealing the nozzle for timed injection of liquid fuel into the expansion chamber;
- an operator actuating the pin from a closed position sealing the nozzle to an open position placing the fuel injection volume in fluid communication with the expansion chamber whereby liquid fuel injected into the expansion chamber at a predetermined time is adiabatically conditioned to a state above a critical point absorbing heat from the vessel wall and the conditioned fuel self-injects through the at least one open fuel injection passage.

12. The two-stroke reciprocating piston engine as defined in claim 11 wherein a volume of the expansion chamber is greater than a volume of the liquid fuel injected into the expansion chamber.

13. The two-stroke reciprocating piston engine as defined in claim 11 wherein the at least one open fuel injection passage is sized for introduction of pressurized oxidizer charge through the at least one open fuel passage from the combustion chamber during a compression cycle of the engine whereby the fuel is partially oxidized to form radicals in molecules in a portion of the fuel to produce a hyper fuel state.

14. The two-stroke reciprocating piston engine as defined in claim 13 wherein heat absorption from the wall of the vessel induces a higher energy state in the fuel by heating above the critical point whereby partial oxidation releases fuel internal energy to convert to the hyper fuel state.

15. The two-stroke reciprocating piston engine as defined in claim 13 wherein the portion of the fuel converted into radical molecules in the hyper fuel state is up to 5% of a fuel charge.

16. The two-stroke reciprocating piston engine as defined in claim 1 wherein the at least two valved inlet ports employ valves having valve stems radially extending with respect to the combustion chamber cylinder head surface.

17. The two-stroke reciprocating piston engine as defined in claim 1 wherein the at least two valved inlet ports comprise at least three valved inlet ports having orifices circumferentially spaced about the axis.

18. The two-stroke reciprocating piston engine as define in claim 17 wherein the at least two unvalved exhaust ports comprise at least three unvalved exhaust ports distributed on a circumference of the cylinder vertically aligned with the at least three valved inlet ports.

19. The two-stroke reciprocating piston engine as defined in claim 18 wherein said at least three valved inlet ports are angled to provide helical flow of pressurized oxidizer charge in the cylinder.

20. The two-stroke reciprocating piston engine as defined in claim 1 wherein the at least two valved inlet ports comprise two valved inlet ports having orifices diametrically opposed from the axis.

21. The two-stroke reciprocating piston engine as defined in claim 20 wherein the two valved inlet port orifices are vertically aligned with the at least two unvalved exhaust port apertures.

22. The two-stroke reciprocating piston engine as defined in claim 1 wherein the at least two unvalved exhaust ports comprise at least three unvalved exhaust ports having apertures distributed on a circumference of the cylinder.

23. The two-stroke reciprocating piston engine as defined in claim 1 further comprising:
- a compressor providing oxidizer through the inlet ports;
- a controller operatively connected to adjust pressure of the oxidizer based on volume of fuel introduced into the combustion chamber.

24. The two-stroke reciprocating piston engine as defined in claim 23 further comprising:
- a bypass valve intermediate the compressor and the inlet ports, and said controller is operatively connected to the bypass valve to adjust induction pressure of the oxidizer.

25. The two-stroke reciprocating piston engine as defined in claim 23 wherein a speed of the compressor is controllable to adjust induction pressure of the oxidizer.

26. The two-stroke reciprocating piston engine as defined in claim 23 wherein at least one valve of at least two valves operably present in the at least two valved inlet ports is controllable to remain closed at a reduced pressure of the oxidizer.

27. The two-stroke reciprocating piston engine as defined in claim 26 wherein the at least two valves comprise four valves and a first two of the valves are controllable to operate and a second two of the valves are controllable to remain closed at a reduced pressure of the oxidizer.

* * * * *